(12) United States Patent
Osuga et al.

(10) Patent No.: US 8,297,386 B2
(45) Date of Patent: Oct. 30, 2012

(54) WORK VEHICLE

(75) Inventors: Masashi Osuga, Nara (JP); Shoko Koda, Gotemba (JP); Hironobu Nishihara, Sakai (JP); Takashi Kuramoto, Sakai (JP); Satoshi Ogata, Sakai (JP); Hiroshi Kawabata, Sakai (JP)

(73) Assignee: Kubota Corporation, Osaka (JP)

( * ) Notice: Subject to any disclaimer, the term of this patent is extended or adjusted under 35 U.S.C. 154(b) by 803 days.

(21) Appl. No.: 12/398,392

(22) Filed: Mar. 5, 2009

(65) Prior Publication Data

US 2009/0241702 A1 Oct. 1, 2009

(30) Foreign Application Priority Data

Mar. 27, 2008 (JP) .................. 2008-084559
Jun. 19, 2008 (JP) .................. 2008-160753
Jun. 24, 2008 (JP) .................. 2008-164523

(51) Int. Cl.
*B60K 25/08* (2006.01)

(52) U.S. Cl. ............. 180/53.6; 180/53.61; 180/53.62; 180/53.7

(58) Field of Classification Search ........... 180/53.6, 180/53.61, 53.62, 53.7
See application file for complete search history.

(56) References Cited

U.S. PATENT DOCUMENTS

| | | | | |
|---|---|---|---|---|
| 4,159,613 A | * | 7/1979 | Knudson et al. | 56/11.3 |
| 5,873,224 A | * | 2/1999 | Murakawa et al. | 56/11.4 |
| 6,324,842 B1 | * | 12/2001 | Ishii | 60/454 |
| 7,503,161 B1 | * | 3/2009 | Mizukawa et al. | 56/14.7 |
| 7,900,735 B2 | * | 3/2011 | Iwaki et al. | 180/253 |
| 8,033,086 B2 | * | 10/2011 | Fukumoto et al. | 56/202 |
| 2005/0284685 A1 | | 12/2005 | Oshima et al. | |
| 2007/0066434 A1 | | 3/2007 | Iida et al. | |
| 2007/0245726 A1 | * | 10/2007 | Iwaki et al. | 60/487 |
| 2008/0152517 A1 | * | 6/2008 | Ishii et al. | 417/423.5 |
| 2008/0210482 A1 | * | 9/2008 | Ishii et al. | 180/242 |
| 2009/0025997 A1 | * | 1/2009 | Ishii et al. | 180/242 |

FOREIGN PATENT DOCUMENTS

| | | |
|---|---|---|
| JP | 5853517 A | 3/1983 |
| JP | 607352 U | 1/1985 |
| JP | 1149817 U | 10/1989 |
| JP | 11257088 | 9/1999 |
| JP | 2000313241 A | 11/2000 |
| JP | 2002262635 A | 9/2002 |
| JP | 2003158907 A | 3/2003 |
| JP | 2006006168 A | 1/2006 |
| JP | 2006304729 A | 9/2006 |
| JP | 2007106138 A | 4/2007 |
| JP | 2007196861 A | 8/2007 |
| JP | 2007300808 A | 11/2007 |
| JP | 2007330229 A | 12/2007 |

* cited by examiner

*Primary Examiner* — Toan To

(74) *Attorney, Agent, or Firm* — The Webb Law Firm

(57) ABSTRACT

A work vehicle including: a body frame; an engine supported by the body frame through an elastic body; a belt transmission mechanism connected to an output shaft of the engine in a power transmissive manner; and a power takeoff (PTO) mechanism connected to the belt transmission mechanism in a power transmissive manner to take out power from the engine. A PTO support bracket configured to support the PTO mechanism is attached to the engine.

9 Claims, 20 Drawing Sheets

WORK VEHICLE

BACKGROUND OF THE INVENTION

1. Field of the Invention

The present invention relates to a work vehicle including an engine supported by a body frame through an elastic body, and a power takeoff mechanism having an input shaft which is driven by an output shaft of the engine through a transmission belt.

2. Description of the Related Art

For a work vehicle as described above, there can be mentioned a riding type mower as disclosed in, for example, Japanese patent application JP11-257088A (paragraph 0012 and FIGS. 2 and 3). This riding type mower includes an engine mounted on a front portion of a body frame, and a transmission shaft (corresponding to power takeoff mechanism) interlocking with a work power takeoff shaft (corresponding to output shaft) protruding frontward from the engine through a transmission belt. The engine is mounted on and supported by the body frame through an anti-vibration rubber. In this work vehicle, if the power takeoff mechanism is supported by the body frame, disadvantages may arise in power transmission and product life. Specifically, in this work vehicle, there may be a relative displacement between the engine and the body frame due to the presence of an elastic body therebetween. If the power takeoff mechanism is supported by the body frame, there may be a change in a distance between the output shaft of the engine and an input shaft of the power takeoff mechanism, leading to slippage after loosening, or to damage after being strained, of the transmission belt that interlocks the output shaft of the engine and the input shaft of the power takeoff mechanism.

There is also mentioned a mower disclosed in Japanese patent application JP2006-6168A (paragraphs 0020 to 0024 and FIGS. 1 to 5) including a rear wheel drive case, a hydrostatic transmission, and a mown grass conveyance duct. The rear wheel drive case supports rear wheels, and has a pair of right and left support portions flanking the duct and an intermediate portion connecting the pair of right and left support portions. The intermediate portion is positioned downward of the conveyance duct. The hydrostatic transmission is connected to a rear side of the left support portion. In this mower, there may be a disadvantage that, because of the presence of a portion of the rear wheel drive case downward of the conveyance duct, the minimum height of the rear wheel drive case from the ground is not large. In addition, there may be an inconvenience that, because of the presence of the hydrostatic transmission between the rear wheel and the conveyance duct, a width of the conveyance duct is made small.

SUMMARY OF THE INVENTION

Therefore, it would be desirable to provide a work vehicle in which power can be taken out without causing poor power transmission and damage on the transmission belt.

Accordingly, a work vehicle according to the present invention includes: a body frame; an engine supported by the body frame through an elastic body; a belt transmission mechanism connected to an output shaft of the engine in a power transmissive manner; a power takeoff (PTO) mechanism connected to the belt transmission mechanism in a power transmissive manner to take out power from the engine; a PTO support bracket configured to support the PTO mechanism, the PTO support bracket being attached to the engine.

According to this configuration, even when a relative displacement between the engine and the body frame occurs due to the presence of the elastic body, a distance between the output shaft of the engine and the input shaft of the power takeoff mechanism is maintained constant, and thus the transmission belt interlocking the output shaft and the input shaft will not suffer no loosening or excessive tension. As a result, while the engine is supported by the elastic body in an anti-vibratory manner, a power takeoff can be smoothly performed without causing tension variation of the transmission belt and at the same time, an excellent durability can be obtained that can hardly cause damage in the transmission belt.

In a preferred embodiment of the present invention, the PTO mechanism includes: a power takeoff shaft (PTO shaft) in parallel with the output shaft; and a friction clutch configured to connect and disconnect a power transmission from the output shaft to the PTO shaft. With this configuration, even when the friction clutch is switched between an on-state and an off-state to connect and disconnect the power transmission to the PTO shaft, tension variation of the transmission belt interlocking the output shaft of the engine and the input shaft of the power takeoff mechanism unlikely occurs. As a result, while the engine is supported by the elastic body in an anti-vibratory manner, and an on-off switching of a power takeoff is performed by a switching of the power takeoff shaft between driving and stopping, a power takeoff can be smoothly performed without causing tension variation of the transmission belt, and at the same time, an excellent durability can be obtained that can hardly cause damage in the transmission belt.

In another preferred embodiment of the present invention, the belt transmission mechanism includes: a transmission belt; an output pulley attached to the output shaft; an input pulley attached to an input shaft for the PTO mechanism; and a tension wheel configured to adjust a tension of the transmission belt and the tension wheel and the input pulley are arranged downward of the output shaft and apart rightward and leftward along a lateral direction of a vehicle body from a position directly below the output shaft. With this configuration, even when the engine is set at a low position, the tension wheel and the power takeoff mechanism can be arranged as close as possible to the engine, and thus the tension wheel and the power takeoff mechanism can be arranged as high as possible from the ground. As a result, a work vehicle having the engine supported by the elastic body in an anti-vibratory manner, in which a power takeoff can be smoothly performed without causing tension variation of the transmission belt, can travel stably on an irregular ground while avoiding troubles regarding contact with the ground, by regulating a height of a gravity center of the vehicle which may otherwise be high due to an engine weight, and by placing the tension wheel and the power takeoff mechanism high above the ground.

Moreover, the work vehicle according to the present invention further includes: a hydrostatic transmission configured to convert power from the output shaft of the engine into advance drive power or reverse drive power and to transmit the converted power to a pair of right and left rear wheels; and a conveyance duct passed between the rear wheels and configured to convey mown grass from the mower unit to a rear side of the vehicle body, wherein a rear wheel drive case disposed at a rear portion of the vehicle body and configured to drivably support the rear wheels includes: a pair of right and left rear wheel transmission case portions extending in a vertical direction of the vehicle body and flanking both lateral sides of the conveyance duct, each having a lower end portion configured to support the rear wheel; and an input case portion extending in a lateral direction of the vehicle body disposed upward of the conveyance duct and connected to upper end portions of the respective rear wheel transmission case portions, and the hydrostatic transmission having a hydraulic pump and a hydraulic motor is connected to a front portion of the input case portion, while the hydraulic pump is arranged lower than the hydraulic motor.

According to this configuration, the input case portion is positioned upward of the conveyance duct, and thus power can be transmitted to a pair of right and left rear wheel transmission case portion, not through a region of the input case located downward of the conveyance duct if any, and power can be transmitted to the right and left rear wheels while the minimum height of the rear wheel drive case from the ground is made higher than a height of the conventional rear wheel drive case.

Since the hydrostatic transmission is connected to the front portion of the input case portion, by simply providing the rear wheel transmission case portion between the rear wheel and the conveyance duct, it becomes possible to drive the right and left rear wheels by a hydrostatic transmission while making a width of the conveyance duct larger than the conventional one.

Since the hydraulic pump of the hydrostatic transmission is arranged lower than the hydraulic motor, the input shaft of the hydrostatic transmission can be positioned lower and thus the tilt of the rotary shaft, for transmitting engine drive power to the hydrostatic transmission, in a front-rear direction between the engine and the hydrostatic transmission can be made zero or as small as possible. As a result, noise is less likely to occur during transmitting power to the hydrostatic transmission, the rear wheel drive case is less likely to be brought into contact with the ground, and at the same time, a large amount of mown grass can be smoothly conveyed through the conveyance duct.

In addition, when each of the right and left rear wheel transmission case portions tilts from a front side to a rear side of the vehicle body, as a lateral side view of the vehicle body, the following effects are obtained. Even when the conveyance duct is designed in such a manner that an upper wall thereof is made higher towards the rear side of the vehicle body, and at the same time, even when the rear wheels are positioned on a rear side of the vehicle body and a distance between the front and rear wheels is made large, the upper end side of the rear wheel transmission case portion is positioned frontward of the lower end side, and thus the height of the upper end of the rear wheel drive case can be made lower. As a result, in addition to an advantage that the rear wheel drive case is less likely to be brought into contact with the ground and a large amount of mown grass can be smoothly conveyed, other advantages are obtained that even when the upper wall of the conveyance duct is made higher towards the rear side, the distance between the front and rear wheels can be made large, and the maximum height from the ground can be made low, to thereby enable a stable traveling.

Other features and advantages of the present invention will become apparent from the descriptions of embodiments below, with reference to the attached drawings.

DETAILED DESCRIPTION OF THE PREFERRED EMBODIMENTS

Hereinbelow, the work vehicle according to the present invention will be described with embodiments in which a mower is illustrated as the work vehicle, with reference to the drawings. In the following descriptions, the terms "right", "left", "front (frontward)", "rear (rearward)", "upper (upward)" and "lower (downward)" with respect to components of the mower refer to the corresponding directions seen from a driver seated in a driver's seat.

Figure 1:
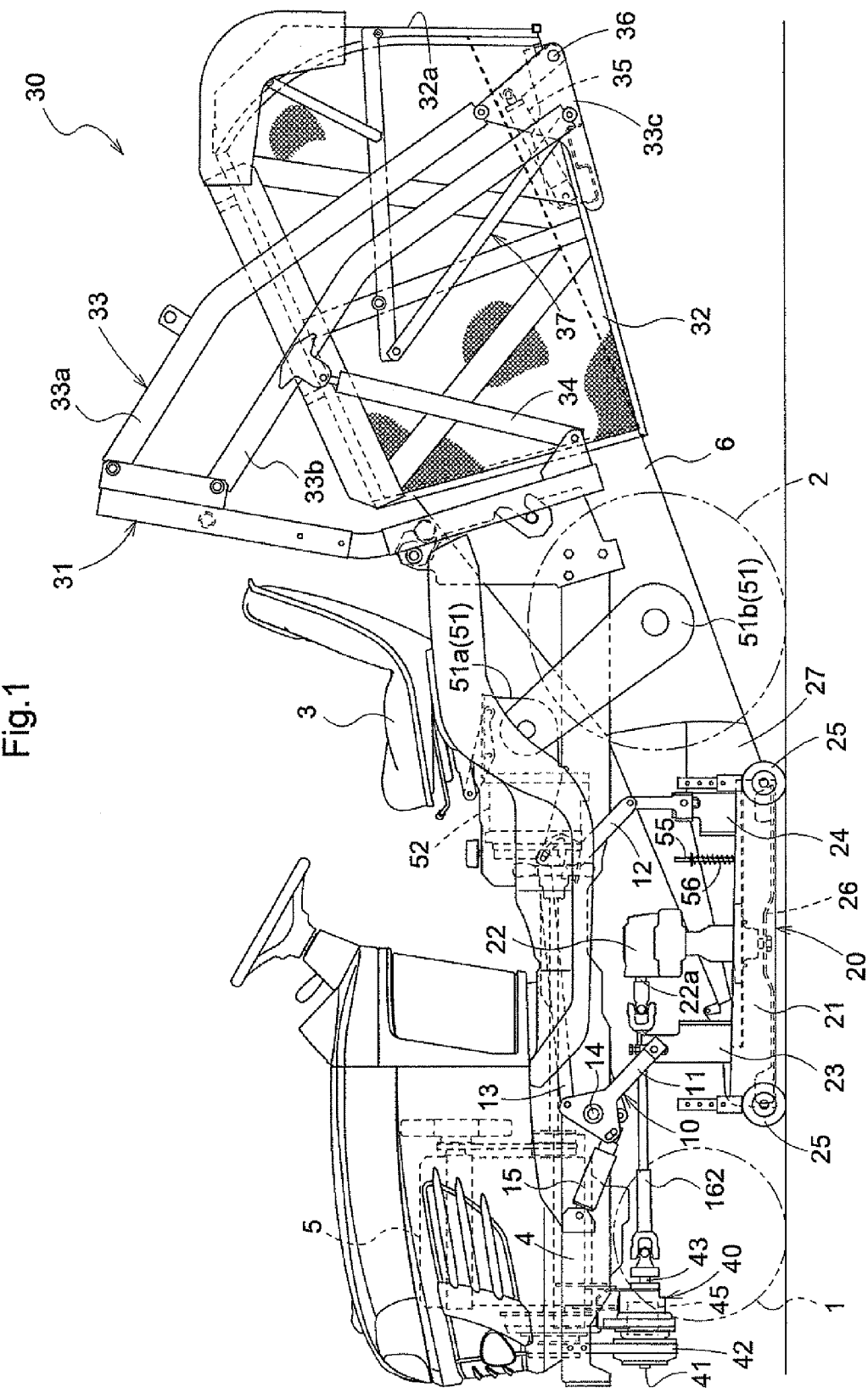
FIG. 1 is an overall side view of a mower.

FIG. 1 is an overall side view of a mower. As shown in this drawing, the mower is automotive with a pair of steerable right and left front wheels 1,1 and a pair of drivable right and left rear wheels 2,2, and has a driver's seat 3 formed in a rear portion of a vehicle body. To a body frame 4 of the mower between the front and rear wheels, a mower unit 20 is linked through a link mechanism 10, and on a rear portion of the body frame 4, a mown grass collector 30 having a grass-collecting container 32 is supported through a support frame 31.

The mower is configured to perform a work of cutting lawn or grass. Specifically, the mower is provided with an engine 5 mounted in a front portion of the vehicle body, and a power takeoff mechanism 40 provided downward of the engine 5. The power takeoff mechanism 40 is configured to transmit an output of the engine 5 to an input shaft 41 through a belt transmission mechanism BT, to transmit drive power of the input shaft 41 to a power takeoff shaft 43 through a hydraulic pressure-operation type friction clutch 45, and to transmit the drive power of the power takeoff shaft 43 to a blade drive mechanism 22 of the mower unit 20 through a universal coupling UC and a rotary shaft 162.

The link mechanism 10 includes: a pair of right and left front rocking links 11,11 supported swingably in a vertical direction by the body frame 4; a pair of right and left rear rocking links 12,12 supported swingably in a vertical direction by the body frame 4; and a pair of right and left interlocking links 13,13.

An end of each of the right and left front rocking links 11 is connected to a corresponding front connecting member 23 provided in a front portion of a mower housing 21 of the mower unit 20. An end of each of the right and left rear rocking links 12,12 is connected to a corresponding rear connecting member 24 provided in a rear portion of the mower housing 21. The front rocking link 11 and rear rocking link 12 on the right side are interlocked by the right interlocking link 13, and the front rocking link 11 and rear rocking link 13 on the left side are interlocked by the left interlocking link 13. One of the pair front rocking links 11,11 is interlocked with a lift cylinder 15.

The link mechanism 10 is operable swingably in a vertical direction relative to the body frame 4, in which the pair of right and left front rocking links 11,11 are uniformly swung through an interlocking by a rotary spindle 14, when one of the front rocking links 11,11 is swung by the lift cylinder 15. Therefore, the link mechanism 10 is configured to lower and lift the mower unit 20, between a lower working state in which ground gauge wheels 25 provided on front and rear sides of the mower housing 21 are brought into contact with the ground, and an upper non-working state in which the ground gauge wheels 25 are lifted from the ground.

In the mower housing 21 are installed two blades 26 aligned in a lateral direction of the mover housing 21. When the mower unit 20 is shifted to the lower working state and the mower unit 20 is traveled, the mower unit 20 drives and rotates the blades 26 about respective axes extending in a vertical direction of the mower housing 21 through the blade drive mechanism 22 to perform a cutting of grass by the blades 26. The mown grass is discharged through a grass-discharging duct 27 located upward of the mower housing 21, utilizing wind generated by the rotation of the blades 26.

The mown grass discharged through the grass-discharging duct 27 is sent to the grass-collecting container 32 due to a conveying effect of wind by the blades 26 and a guiding effect of a conveyance duct 6 extending in a front-rear direction of the vehicle body between the right and left rear wheels 2,2, and collected and stored in the grass-collecting container 32.

As shown in FIG. 1, in the mown grass collector 30, an upper end portion of the support frame 31 and a rear end portion of the grass-collecting container 32 are linked through a link mechanism 33 having: pairs of upper and lower lifting links 33a,33b provided on right and left sides of the support frame 31 each pair extending rearward from the support frame 31, with each lifting link swingably attached to the support frame 31; and container supports 33c provided on the right and left sides of the support frame 31 each connecting free ends of the lifting links 33a,33b on the corresponding side. The mown grass collector 30 has lift cylinders 34 disposed on both lateral sides of the grass-collecting container 32, and a dump cylinder 35 disposed downward of a rear portion of the grass-collecting container 32.

Accordingly, in the mown grass collector 30, the right and left lift cylinders 34,34 are configured to lift and lower the link mechanism 33, to thereby lift and lower the grass-collecting container 32 relative to the support frame 31, and the dump cylinder 35 is configured to swing the grass-collecting container 32 in a vertical direction relative to the container support 33c about an axis of a rotary spindle 36. With this configuration, the grass-collecting container 32 is switchable between a lower collecting state in which the grass-collecting container 32 lies in the front-rear direction of the vehicle body in a rear portion of the vehicle body and communicates with the conveyance duct 6 to collect mown grass from the conveyance duct 6, and an upper discharging state in which the grass-collecting container 32 stands vertically relative to the vehicle body on a rear upper side of the vehicle body and opens a discharge port lid 32a by an action of opening-closing links 37 to dump mown grass stored in the grass-collecting container 32.

Figure 2:
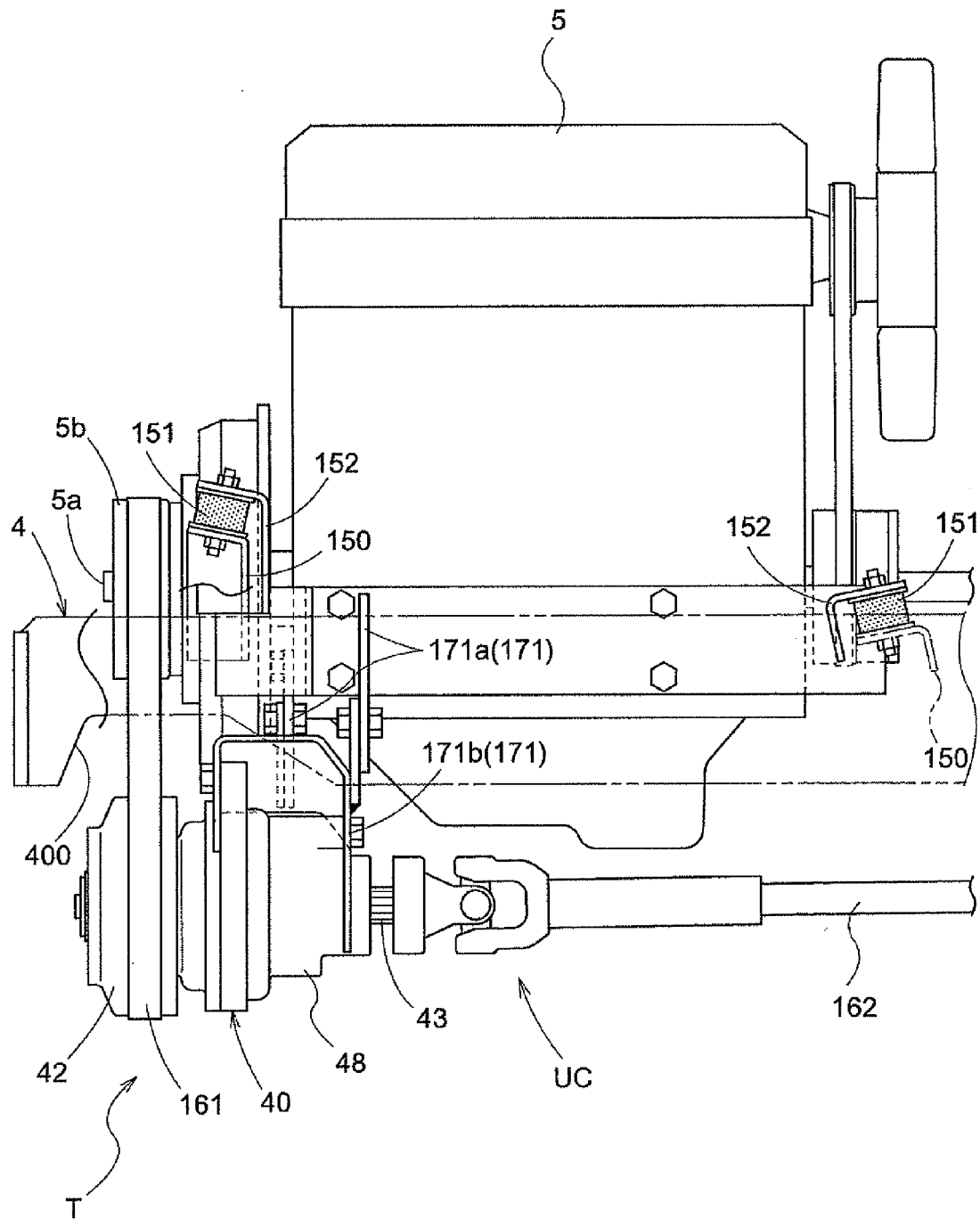
FIG. 2 is a side view of a transmission device.
Figure 3:
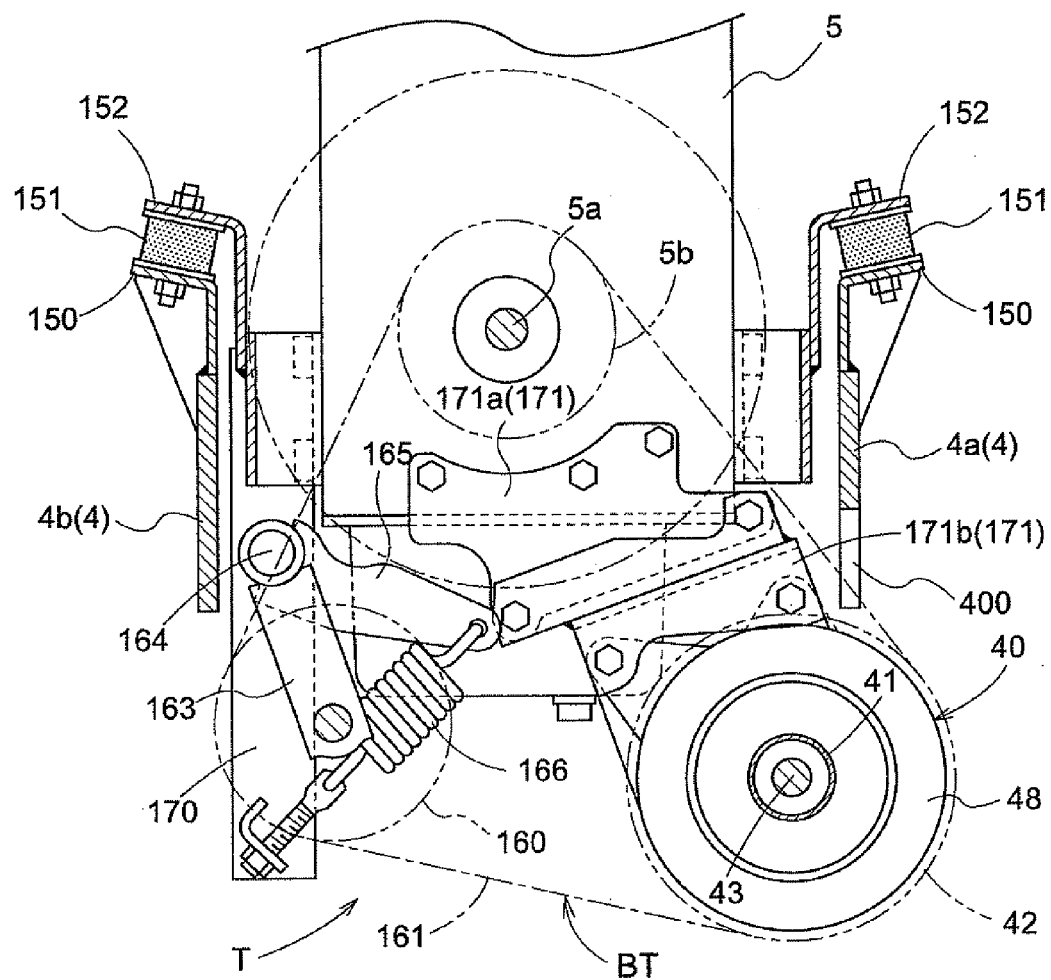
FIG. 3 is a front view of the transmission device.
Figure 4:
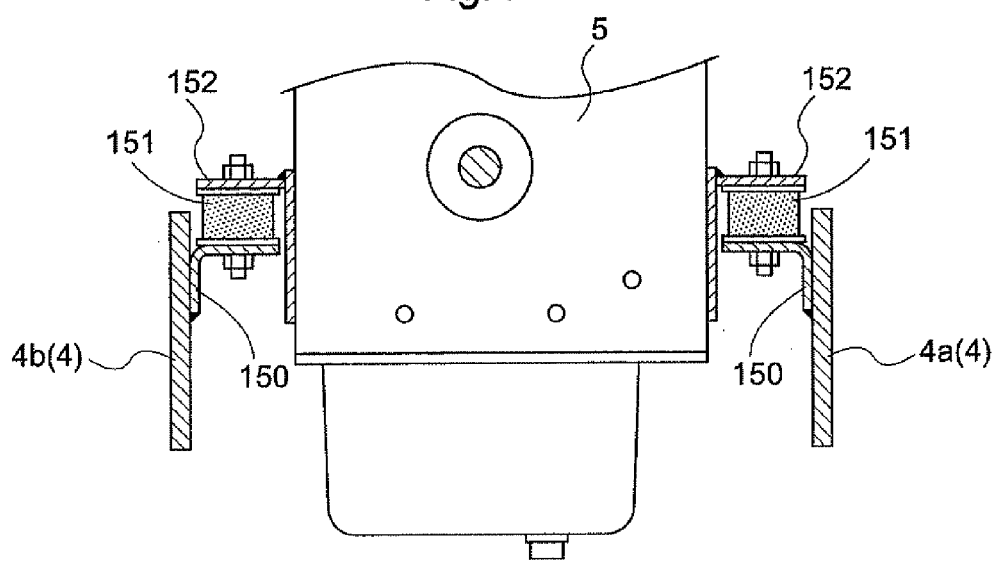
FIG. 4 is a front view of a support structure for an engine.

As shown in FIGS. 2, 3 and 4, the body frame 4 of the vehicle is provided with four support portions 150 each formed of a bracket, with two brackets being attached to front and rear positions in a front end portion of the left main frame 4a of the body frame 4, and two brackets being attached to front and rear positions in a front end portion of the right main frame 4b of the body frame 4. Each support portion 150 supports the engine 5 through an elastic body 151 made of cushion rubber. Each elastic body 151 is mounted on an upper face of the support portion 150, and connected to the engine 5 through a connecting member 152 provided on a lower portion of the engine 5.

FIG. 2 is a side view of a transmission device T for the mower transmitting engine power to the mower unit 20. FIG. 3 is a front view of the transmission device T. As shown in these drawings, in addition to the power takeoff mechanism 40, the transmission device T includes: a tension wheel 160 disposed downward of the engine 5; an input pulley 42 provided uniformly rotatably on the cylindrical input shaft 41 extending in the front-rear direction of the vehicle body positioned at a front end portion of the power takeoff mechanism 40 (see FIG. 5); an output pulley 5b provided uniformly rotatably on an output shaft 5a extending frontward from a front end portion of the engine 5; a transmission belt 161 wrapped around the tension wheel 160, the input pulley 42 and the output pulley 5b; and the rotary shaft 162 connected to the power takeoff shaft 43 of the power takeoff mechanism 40 extending in the front-rear direction of the vehicle body as well as an input shaft 22a of the blade drive mechanism 22.

As shown in FIG. 3, the tension wheel 160 is swingably biased to the transmission belt 161 by a tension spring 166 through a swingable tension arm 163 which supports the tension wheel 160 in a rotatable manner, and a spring hooking arm 165 uniformly swingably connected to a rotary spindle 164 of the tension arm 163.

Figure 5:
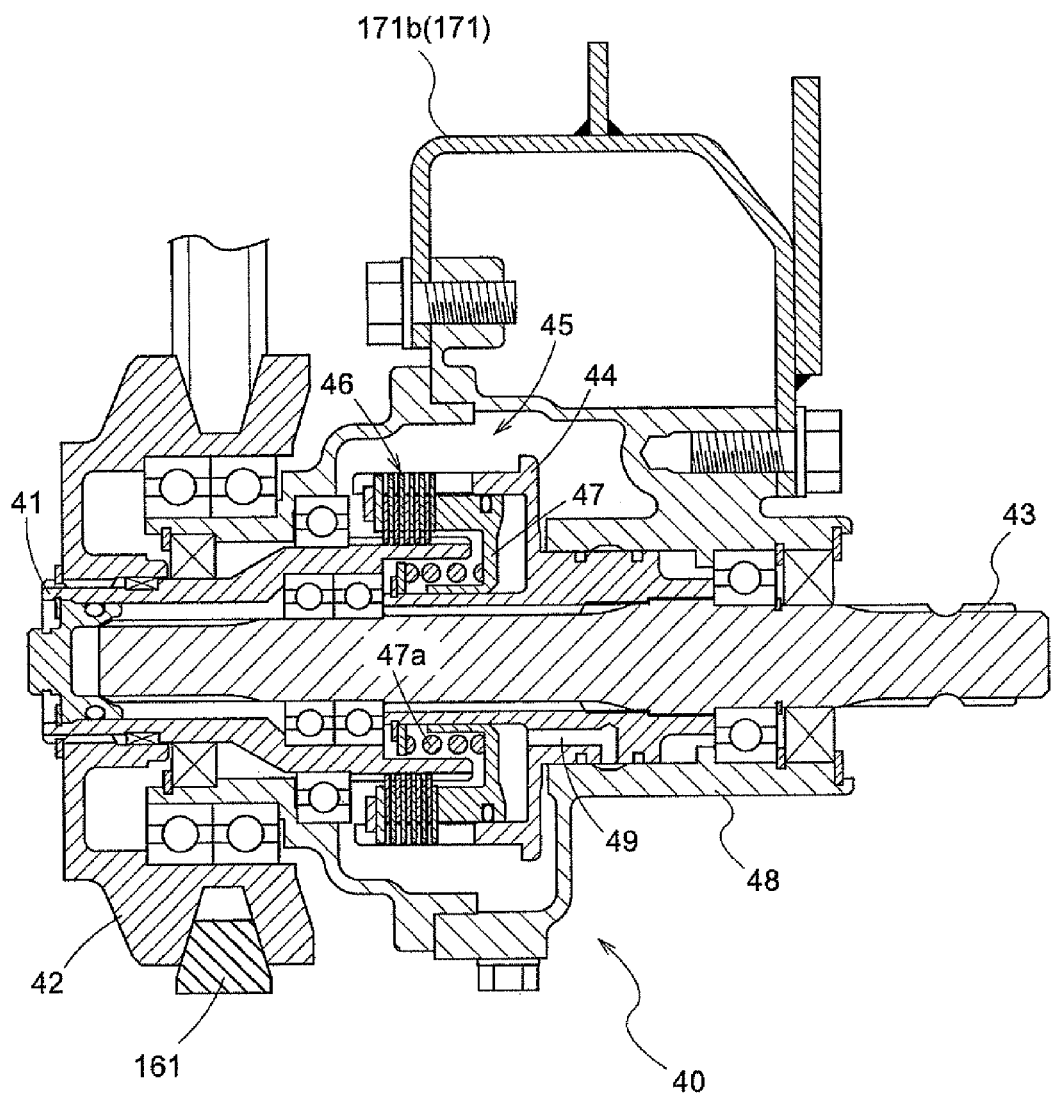
FIG. 5 is a cross section of a power takeoff mechanism.

FIG. 5 is a cross section of the power takeoff mechanism 40. As shown in this drawing, in addition to the input shaft 41 and the power takeoff shaft 43, the power takeoff mechanism 40 includes the friction clutch 45 having a clutch body 44 uniformly rotatably provided on the power takeoff shaft 43.

In addition to the clutch body 44, the friction clutch 45 includes: a multiplate type friction clutch main body 46 bridging the clutch body 44 and an end portion of the input shaft 41; and a hydraulic piston 47 installed in the clutch body 44. An operation oil passage 49 is made between the clutch body 44 and a casing 48, through which a hydraulic pressure is supplied to or released from the hydraulic piston 47, to switch the friction clutch 45 between an on-state in which the power takeoff shaft 43 is driven, and an off-state in which the power takeoff shaft 43 is stopped.

Specifically, when a hydraulic pressure is supplied, the friction clutch 45 switches the friction clutch main body 46 to the on-state by the hydraulic piston 47 to interlock uniformly rotatably the input shaft 41 and the power takeoff shaft 43, and when a hydraulic pressure is released, the friction clutch 45 switches the friction clutch main body 46 to the off-state by returning the hydraulic piston 47 with a return spring 47a to disengage the input shaft 41 and the power takeoff shaft 43.

To sum up, in the transmission device T, by operating the tension wheel 160, a tension for performing power transmission is imparted to the transmission belt 161 to thereby interlock the input shaft 41 of the power takeoff mechanism 40 and the output shaft 5a of the engine 5 through the transmission belt 161. By switching the friction clutch 45 to the on-state, the input shaft 41 and the power takeoff shaft 43 of the power takeoff mechanism 40 are interlocked through the friction clutch 45 to thereby switch the power takeoff to an on-state, in which the power takeoff shaft 43 is driven and the drive power for the power takeoff shaft 43 is transmitted to the blade drive mechanism 22 through the rotary shaft 162.

Also in the transmission device T, by switching the friction clutch 45 to the off-state, the input shaft 41 and the power takeoff shaft 43 of the power takeoff mechanism 40 are disengaged to thereby switch the power takeoff to an off-state, in which the power takeoff shaft 43 is stopped, and then the power transmission to the blade drive mechanism 22 is disconnected.

As shown in FIG. 3, the tension wheel 160 is supported through the tension arm 163 by a mounting member 170 for imparting tension connected to the lower portion of the engine 5. As shown in FIGS. 2 and 3, the power takeoff mechanism 40 is supported by a mounting member (PTO support bracket) 171 for power takeoff connected to the lower portion of the engine 5. With this configuration, regardless of a relative displacement between the engine 5 and the body frame 4 which may occur due to the presence of the elastic body 151 for anti-vibration, the transmission belt 161 interlocks the output shaft 5a of the engine 5 and the input shaft 41 of the power takeoff mechanism 40, without generating tension variation of the transmission belt 161.

As shown in FIGS. 2 and 3, the mounting member 171 for power takeoff includes: an engine mounting body 171a connected to the lower portion of the engine 5 through connecting bolts; and a power takeoff-side mounting body 171b having an upper end portion welded to the mounting body 171a and a lower end portion connected to the casing 48 of the power takeoff mechanism 40 through connecting bolts.

The tension wheel 160 and the power takeoff mechanism 40 are arranged as shown in FIG. 3. Specifically, the tension wheel 160 and the input shaft 41 of the power takeoff mechanism 40 are positioned downward of the output shaft 5a of the engine 5 and aligned in a lateral direction of the vehicle body, and at the same time, the input shaft 41 is positioned outward in one lateral direction of the vehicle body away from a position directly below the output shaft 5a, and the tension wheel 160 is positioned outward in the other lateral direction of the vehicle body away from a position directly below the output shaft 5a.

It should be noted that, as shown in FIGS. 1, 2 and 3, the body frame 4 has a cutout 400 formed in the front end portion of the left main frame 4a, for preventing an interference between the main frame 4a and the transmission belt 161.

Figure 6:
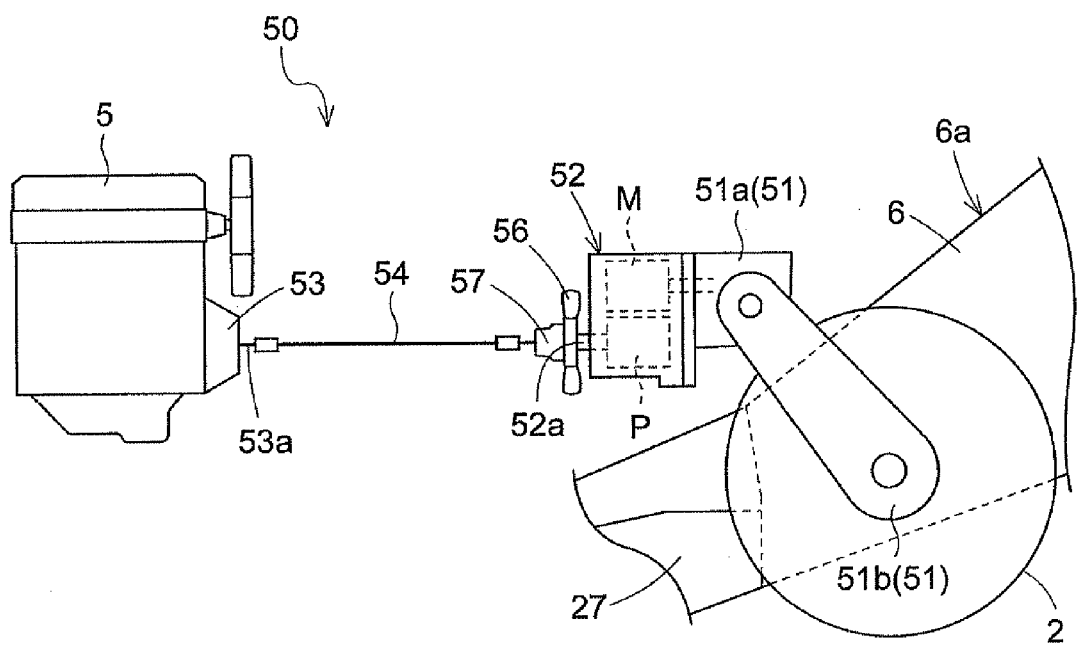
FIG. 6 is a side view of a traveling transmission device.
Figure 7:
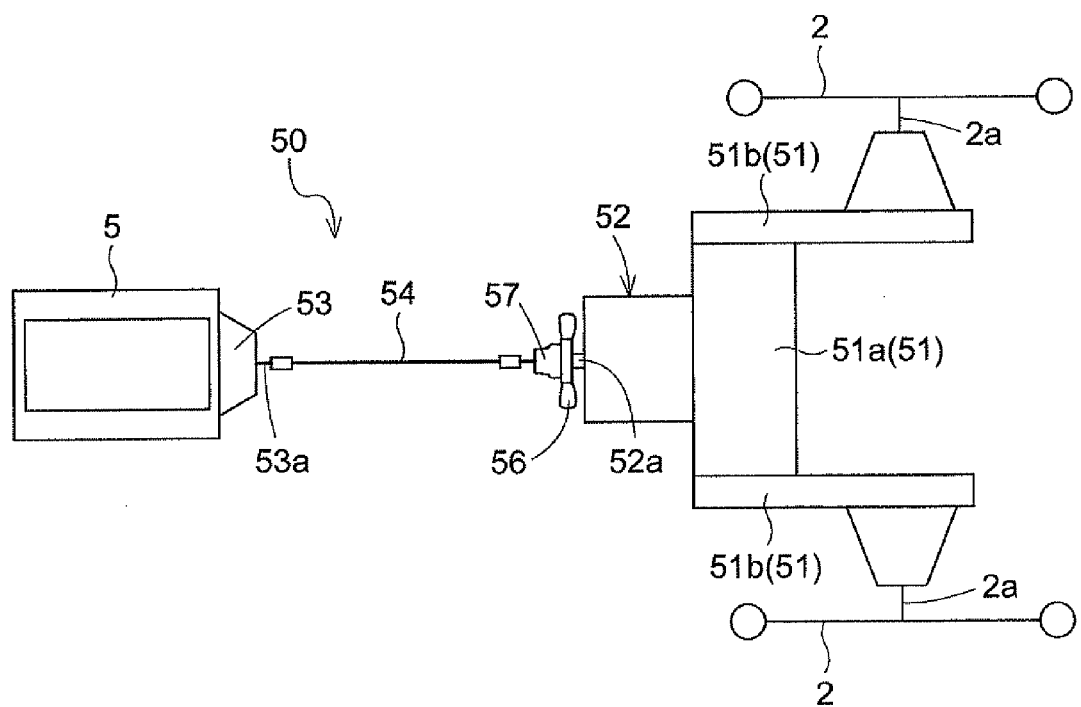
FIG. 7 is a plan view of the traveling transmission device.

FIG. 6 is a side view of a traveling transmission mechanism 50 mounted on the mower. FIG. 7 is a plan view of the traveling transmission mechanism 50. As is apparent from FIGS. 1, 6 and 7, the traveling transmission mechanism 50 includes: a rear wheel drive case 51 provided in the rear portion of the vehicle body; a hydrostatic transmission 52 (hereinafter, simply referred to as "HST 52") connected to a front side of an input case portion 51a which is an upper end portion of the rear wheel drive case 51; a clutch housing 53 connected to a rear portion of the engine 5 so as to take out drive power from the output shaft 5a of the engine 5; and a rotary shaft 54 connecting an output shaft 53a of the clutch housing 53 and a pump shaft 52a as an input shaft of the HST 52 in a uniformly rotatable manner. The rotary shaft 54 and the pump shaft 52a are connected through a connecting part 57 having a cooling fan 56. The cooling fan 56 is configured to supply cooling air to the HST 52.

Figure 8:
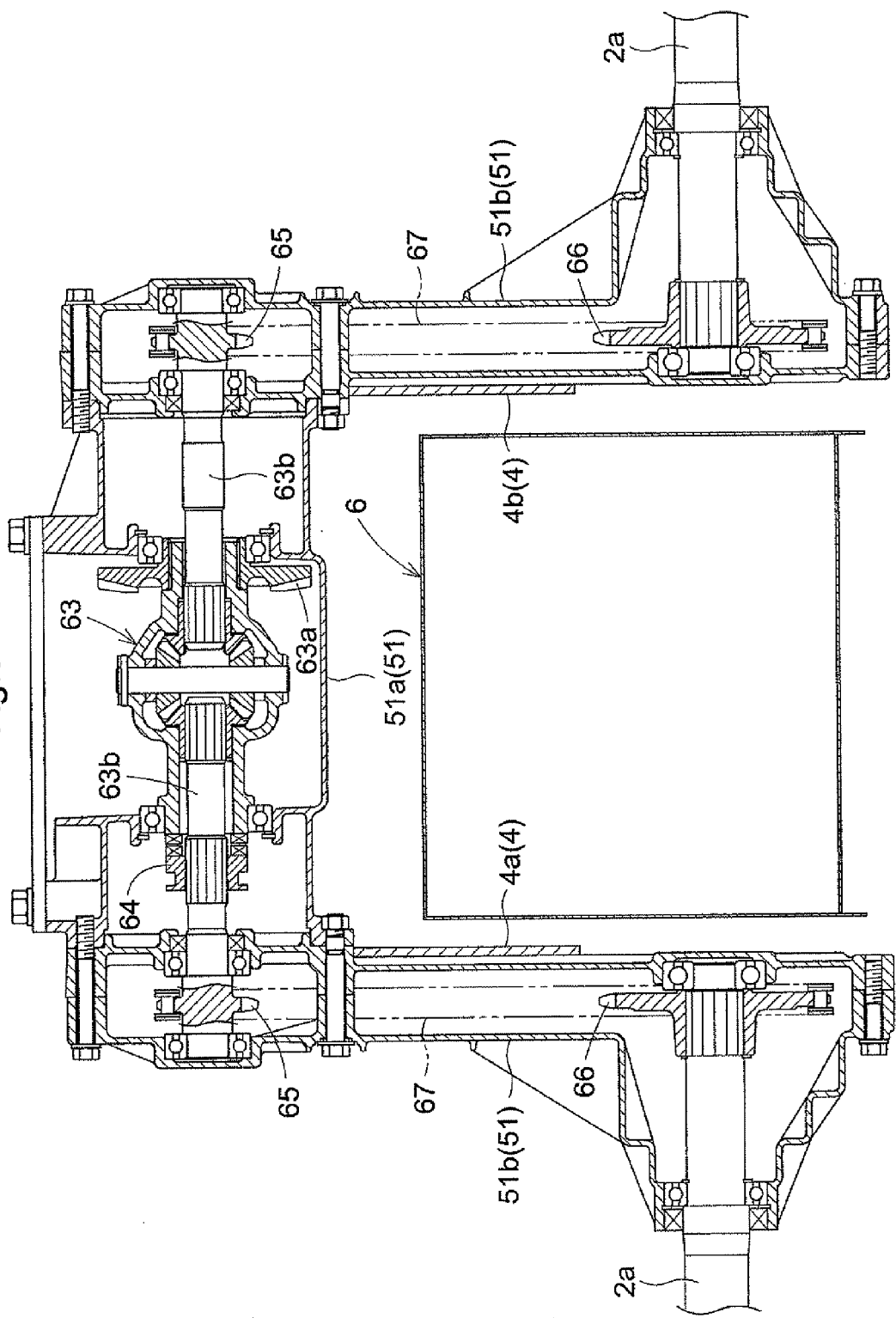
FIG. 8 is a longitudinal sectional rear view of a rear wheel drive case.

FIG. 8 is a longitudinal sectional rear view of the rear wheel drive case 51. As shown in FIGS. 6 to 8, in addition to the input case portion 51a, the rear wheel drive case 51 includes: a rear wheel transmission case portion 51b extending in a vertical direction of the vehicle body, whose upper end portion is connected to an end portion of the input case portion 51a on a left side of the vehicle body; and another rear wheel transmission case portion 51b extending in a vertical direction of the vehicle body, whose upper end portion is connected to another end portion of the input case portion 51a on a right side of the vehicle body.

The rear wheel drive case 51 is supported by the pair of right and left main frames 4a,4b of the body frame 4, while the input case portion 51a extending in the lateral direction of the vehicle body is positioned upward of the conveyance duct 6, and the right and left rear wheel transmission case portions 51b,51b flank both lateral sides of the conveyance duct 6.

As shown in FIGS. 6 and 7, each of the right and left rear wheel transmission case portions 51b,51b tilts down from a front side to a rear side of the vehicle body, when seen from a lateral side of the vehicle body. On the other hand, the conveyance duct 6 becomes larger in height from a front side to a rear side of the vehicle body, and an upper wall 6a of the conveyance duct 6 tilts up from the front side to the rear side of the vehicle body. Because of this inclined posture of the rear wheel transmission case portion 51b, the upper end portion of the rear wheel drive case 51 can be positioned low, regardless of the above-mentioned shape of the conveyance duct 6, and regardless of the position of the rear wheels 2 in terms of the front-rear direction of the vehicle body.

Figure 9:
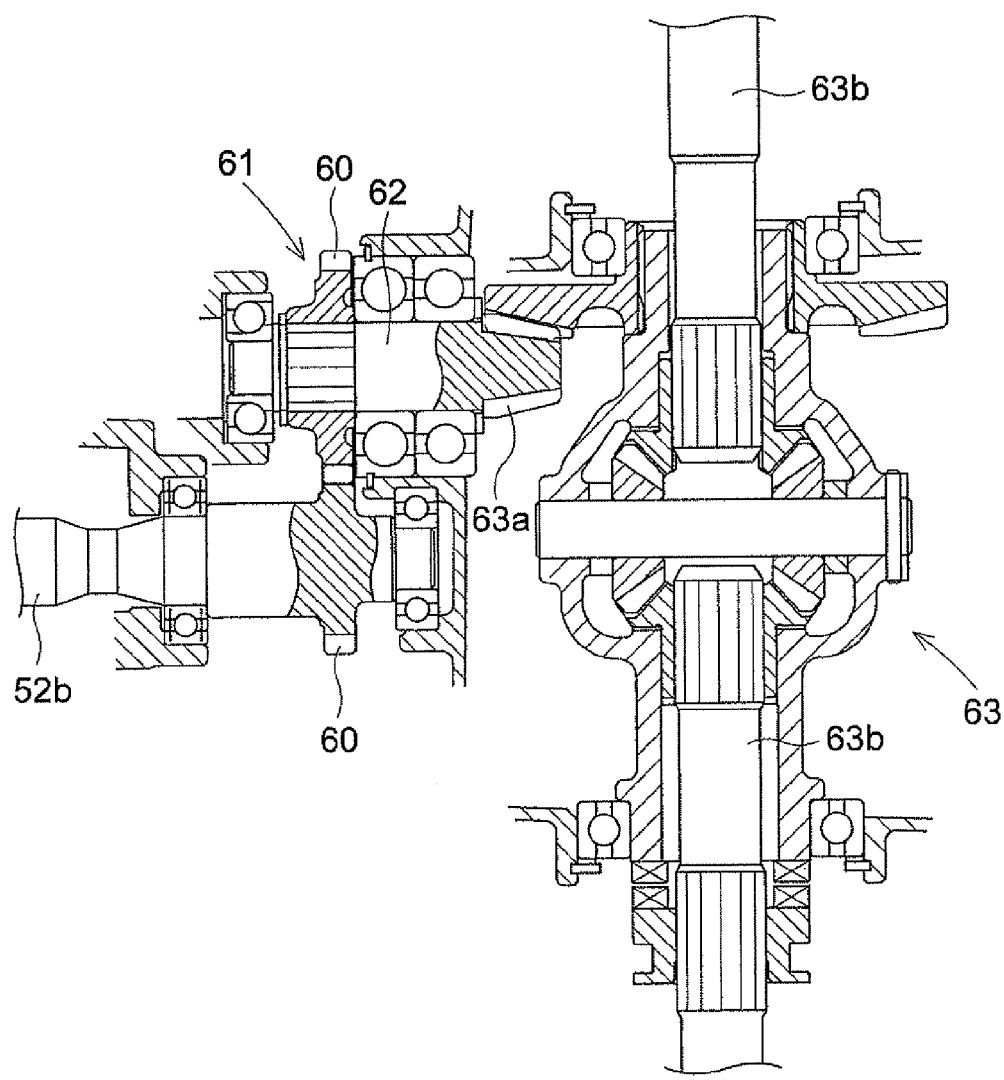
FIG. 9 is a plan view of a reduction mechanism.

As shown in FIGS. 8 and 9, the input case portion 51a is provided with a reduction mechanism 61 in which an input gear 60 is connected to a motor shaft 52b of the HST 52, and a differential mechanism 63 in which an input gear 63a and an output shaft 62 of the reduction mechanism 61 are interlocked. A differential lock member 64 is uniformly rotatably and slidably fitted onto one output shaft 63b of the differential mechanism 63 by a spline structure. By making the differential lock member 64 bite a case portion of the differential mechanism 63, the differential mechanism 63 is shifted to create a differential lock state, while by making the differential lock member 64 away from the case portion of the differential mechanism 63, the differential mechanism 63 is shifted to create a differential state.

As shown in FIGS. 7 and 8, the rear wheel transmission case portion 51b is provided with a rear axle 2a rotatably installed in a lower end portion thereof through which the rear wheel 2 is rotatably supported. Each rear wheel transmission case portion 51b is provided with an input sprocket 65 uniformly rotatably attached to an end portion of the output shaft 63b of the differential mechanism 63; a rear wheel drive sprocket 66 uniformly rotatably attached to the rear axle 2a;

and a transmission chain 67 interlocking the rear wheel drive sprocket 66 and the input sprocket 65.

Figure 10:
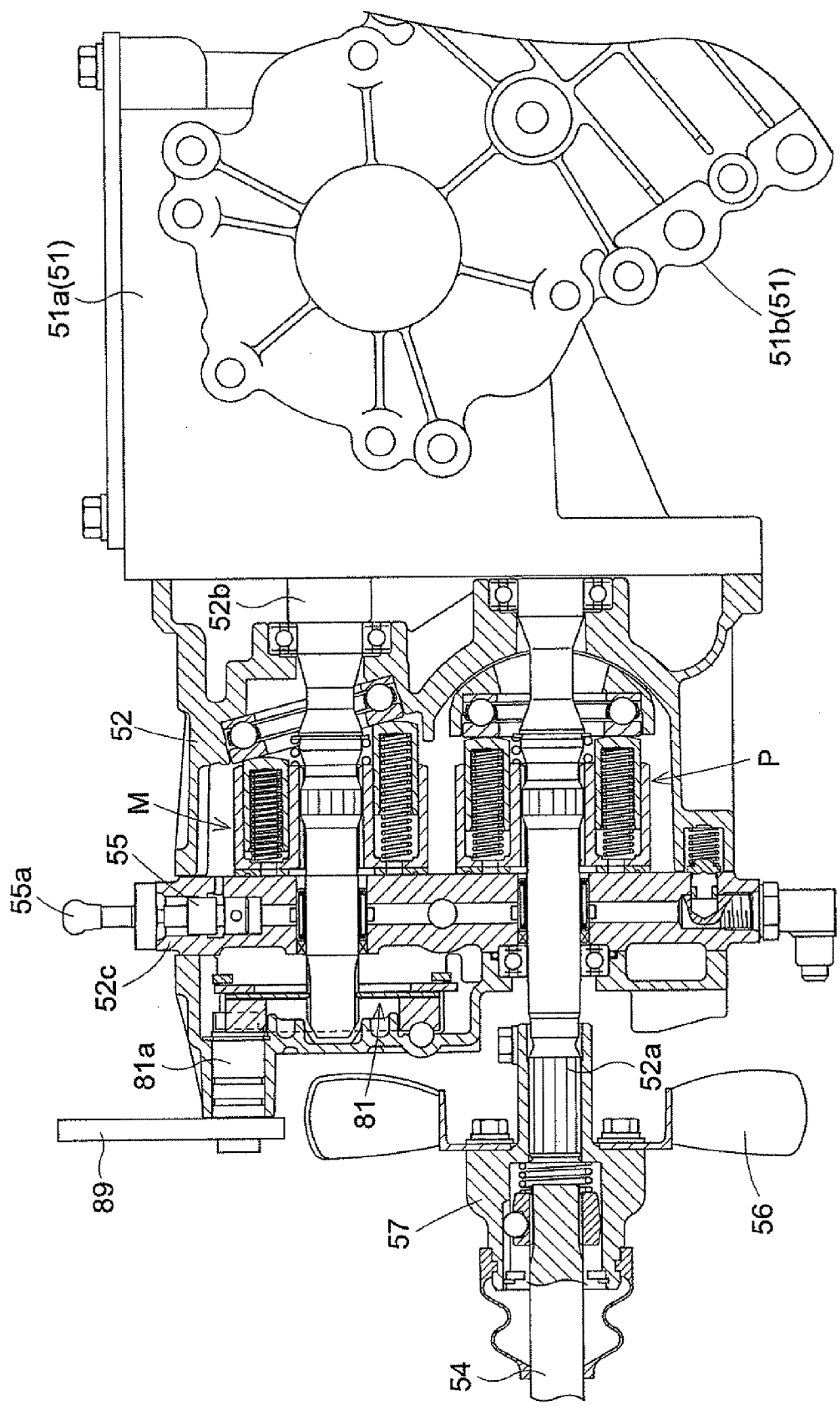
FIG. 10 is a longitudinal sectional side view of a hydrostatic transmission.

As shown in FIG. 10, the HST 52 is provided with a hydraulic pump P in an axial plunger shape with the pump shaft 52a, whose volume is variable, and a hydraulic motor M in an axial plunger shape with the motor shaft 52b, which is driven by pressure oil from the hydraulic pump P. The HST 52 is supported by the input case portion 51a, with the hydraulic pump P being arranged lower than the hydraulic motor M, so as to cancel an inclined state of the rotary shaft 54 in the front-rear direction.

In other words, the traveling transmission mechanism 50 transmits drive power of the engine 5 through a main clutch mechanism in the clutch housing 53 and through the rotary shaft 54 to the pump shaft 52a of the HST 52, where the drive power is converted to advance drive power and reverse drive power. These advance drive power and reverse drive power are nonstop-wise varied to be output from the motor shaft 52, which is then input to the input case portion 51a of the rear wheel drive case 51 by the input gear 60, and then transmitted to the right and left output shafts 63b,63b of the differential mechanism 63. The drive power of the left output shaft 63b is transmitted to the left rear axle 2a through the left rear wheel transmission case portion 51b to thereby drive the left rear wheel 2, while the drive power of the right output shaft 63b is transmitted to the right rear axle 2a through the right rear wheel transmission case portion 51b to thereby drive the right rear wheel 2.

As shown in FIG. 10, the HST 52 is provided with a bypass valve 55 built in a port block 52c of the HST 52. The bypass valve 55 is switchable between an opened state and a closed state, by an operation of an operating tool 55a protruding upward from the port block 52c. When the bypass valve 55 is opened, a drive circuit with a high pressure between the hydraulic pump P and the hydraulic motor M in the HST 52 communicates with a drive circuit with a low pressure, so that pressure oil short-circuits from a high-pressure side to a low-pressure side.

Figure 11:
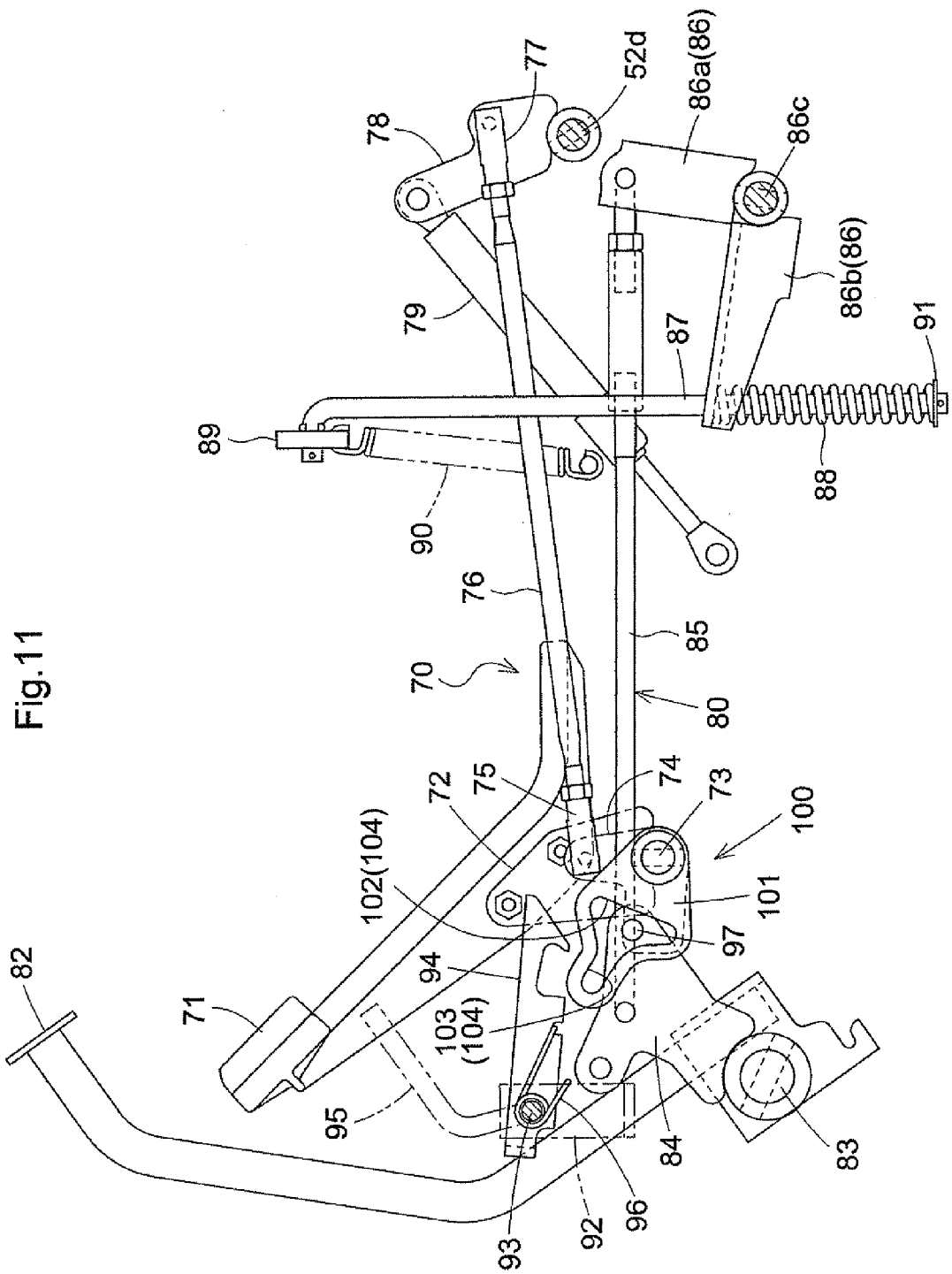
FIG. 11 is a side view of a speed change operation device and a brake operation device.
Figure 12:
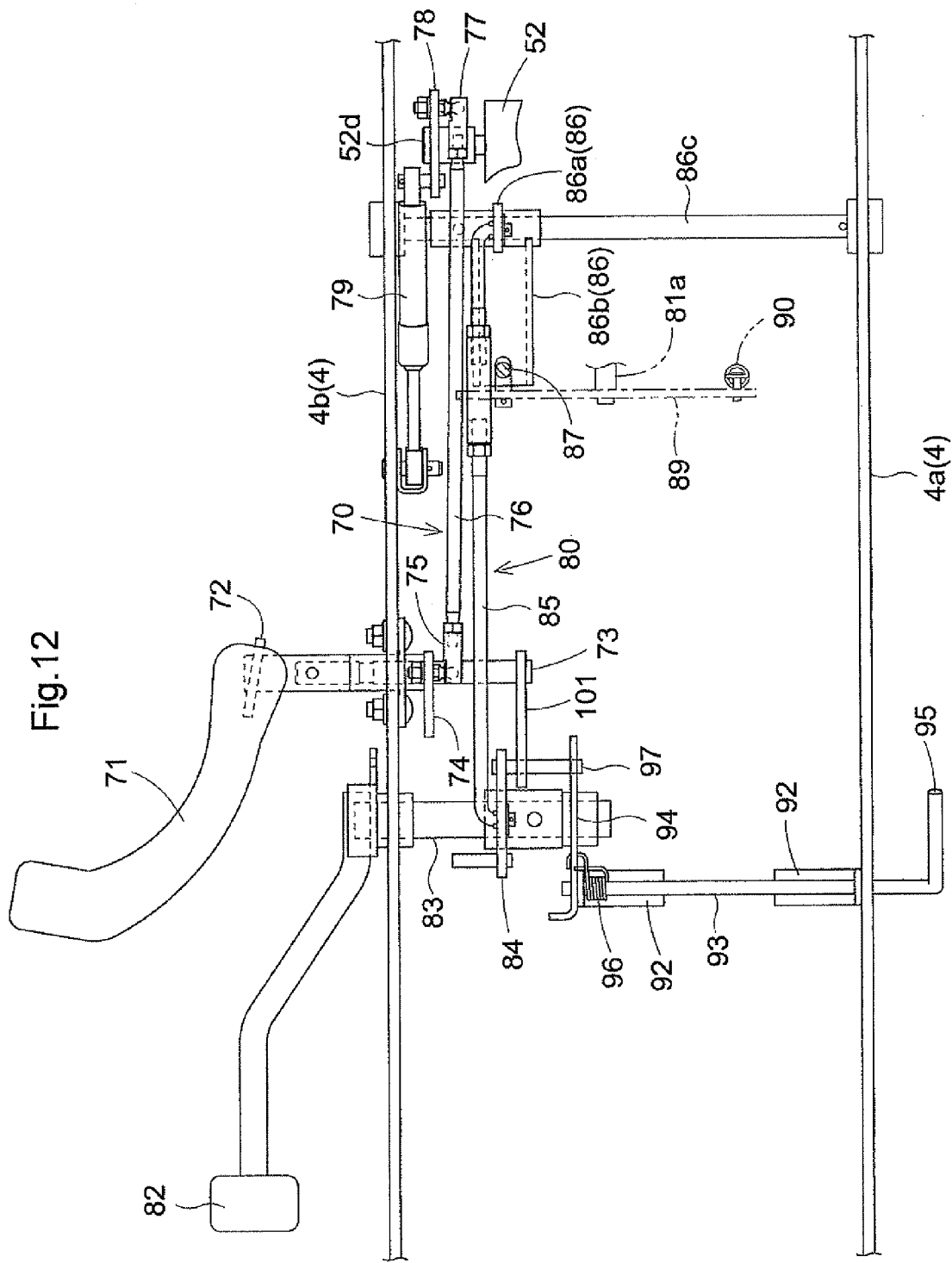
FIG. 12 is a plan view of the speed change operation device and the brake operation device.

FIG. 11 is a side view of a speed change operation device 70 for operating the HST 52. FIG. 12 is a plan view of the speed change operation device 70. As shown in these drawings, the speed change operation device 70 includes: a shift pedal 71 provided in a driving part; an interlocking member 74 uniformly rotatably provided on a rotary spindle 73, which supports the shift pedal 71 through a connecting plate 72; an interlocking rod 76 extending in the front-rear direction of the vehicle body, whose front end is connected to the interlocking member 74 through a joint 75; and a shift arm 78 connected to a rear end of the interlocking rod 76 through a joint 77.

FIGS. 13 to 16 show side views of a neutral operation mechanism at various operation positions of the shift pedal 71.

The shift arm 78 is uniformly rotatably connected to a rotating operation shaft 52d of the HST 52. The shift arm 78 is connected to one end of a damper 79, the other end of which is supported by the body frame 4. In other words, the speed change operation device 70 is configured to operate a speed change of the HST 52, by depressing the shift pedal 71 frontward or rearward relative to the vehicle body from a neutral position N about an axis of the rotary spindle 73 (see FIG. 14).

Specifically, when the shift pedal 71 is depressed frontward relative to the vehicle body, the interlocking member 74, together with the shift pedal 71, is swung towards the front side of the vehicle body about the axis of the rotary spindle 73 to thereby pull the interlocking rod 76, by which the shift arm 78 is swung towards the front side of the vehicle body about an axis of the speed change operation shaft 52d to thereby rotate the speed change operation shaft 52d in an advancing direction. As a result, the HST 52 is shifted to an advance drive state.

When the shift pedal 71 is depressed rearward relative to the vehicle body, the interlocking member 74, together with the shift pedal 71, is swung towards the rear side of the vehicle body about the axis of the rotary spindle 73 to thereby push the interlocking rod 76, by which the shift arm 78 is swung towards the rear side of the vehicle body about the axis of the speed change operation shaft 52d to thereby rotate the speed change operation shaft 52d in a reversing direction. As a result, the HST 52 is shifted to a reverse drive state.

As shown in FIG. 10, in a front portion of a casing of the HST 52, a traveling brake 81 is built in. The traveling brake 81 is configured to apply the brake on the right and left rear wheels 2,2 by imparting a braking force to the motor shaft 52b.

As is apparent from FIGS. 11 and 12, a brake operation device 80 includes: a brake pedal 82 provided in the driving part; an interlocking member 84 uniformly rotatably provided on a rotary spindle 83 of the brake pedal 82; an interlocking rod 85 extending in the front-rear direction of the vehicle body, whose front end is connected to the interlocking member 84; an interlocking link 86 with a pedal-side arm 86a connected to a rear end of the interlocking rod 85; an interlocking rod 87 extending in the vertical direction of the vehicle body which is inserted into a brake-side arm 86b of the interlocking link 86; an interlocking spring 88 held at a lower end portion of the interlocking rod 87; and a brake operation link 89 connected to an upper end portion of the interlocking rod 87.

As shown in FIGS. 10 and 12, an intermediate portion of the brake operation link 89 is uniformly rotatably connected to a rotating operation shaft 81a of the traveling brake 81. A return spring 90 is connected to one end portion of the brake operation link 89 which end portion is opposite to the end portion to which the interlocking rod 87 is connected. In other words, the brake operation device 80 is configured to operate a shifting of the traveling brake 81 to the on-state, by depressing the brake pedal 82 about an axis of the rotary spindle 83. Specifically, when the brake pedal 82 is depressed, the interlocking member 84, together with the brake pedal 82, is swung towards the front side of the vehicle body about an axis of the rotary spindle 83 to thereby pull the interlocking rod 85, by which the brake-side arm 86b of the interlocking link 86 is swung downward about an axis of a rotary spindle 86c to thereby lower the interlocking rod 87 through the interlocking spring 88 and a spring bearing 91, and the brake operation link 89 is swung about an axis of the rotating operation shaft 81a to thereby rotate the rotating operation shaft 81a to an on-brake side. As a result, the traveling brake 81 is switched to an on-state.

As shown in FIGS. 11 and 12, the brake operation device 80 is provided with a brake holding arm 94 supported swingably in a vertical direction through a rotary spindle 93 by a portion of the vehicle body in the vicinity of the interlocking member 84, and a locking lever 95 provided on one end portion of the rotary spindle 93 which end portion is opposite to the end portion to which the brake holding arm 94 is connected.

Figure 17:
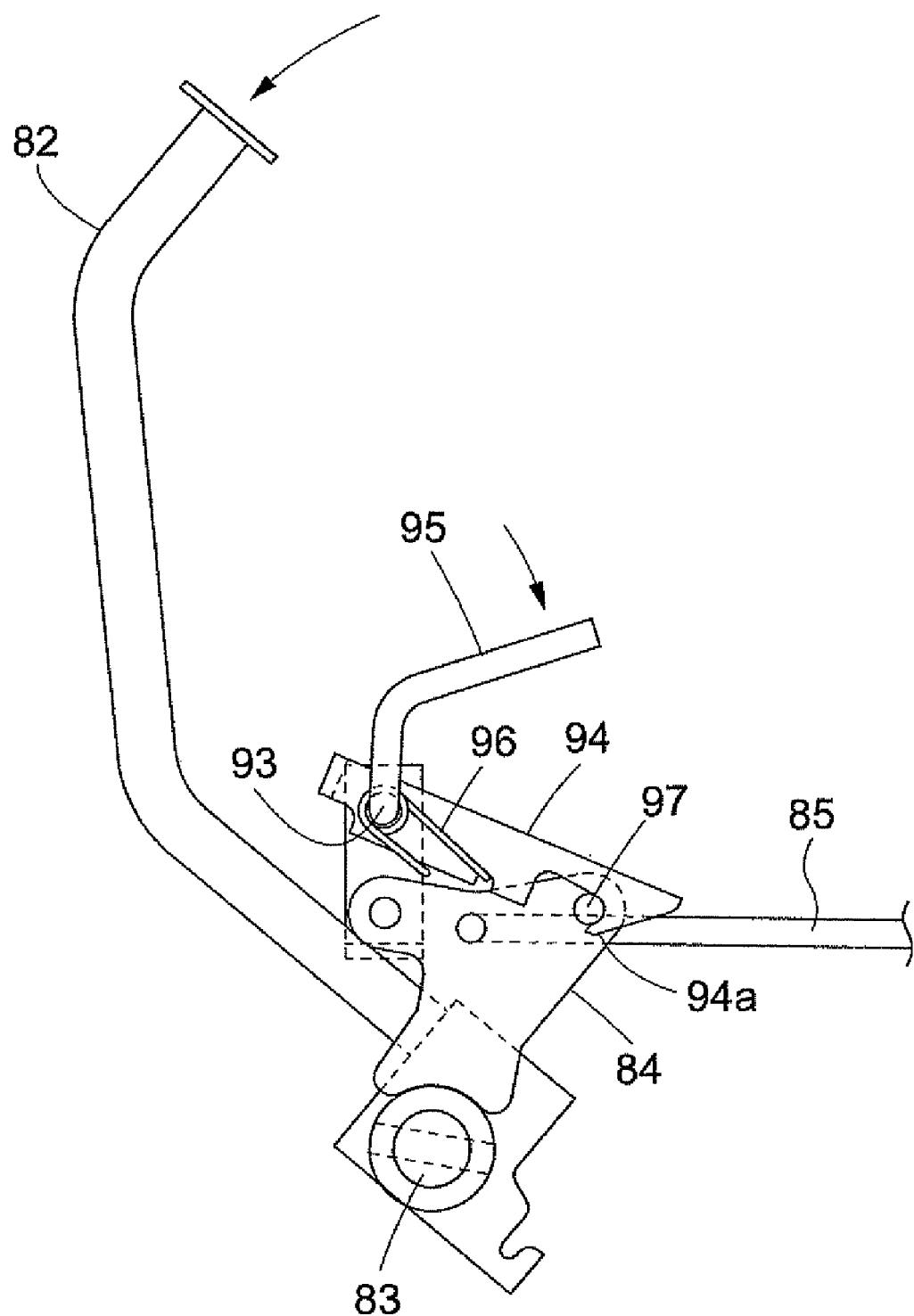
FIG. 17 is a side view showing a brake holding arm in operation.

FIG. 17 is a side view showing the brake holding arm 94 in operation. As shown in this drawing, under a condition in which the brake pedal 82 is depressed, the rotary spindle 93 is rotated by the locking lever 95 to downward swing the brake holding arm 94 against a return spring 96. Accordingly, a hook portion 94a of the brake holding arm 94 engages with a rod-shaped locking member 97 provided on the interlocking member 84 to retain the brake pedal 82 in a depressed state against a restoring force to resume an off-brake position. With this configuration, the brake holding arm 94 retains the traveling brake 81 in an on-state, with the traveling brake 81 serving as a parking brake acting on the right and left rear wheels 2,2.

When the locking lever 95 is operated to swing to a release side, the brake holding arm 94 is swung upward to leave the locking member 97, which cancels the retained on-state of the traveling brake 81.

As shown in FIGS. 11 and 12, the brake operation device 80 is provided with a neutral operation mechanism 100 bridging between the interlocking member 84 and the rotary spindle 73, which is configured to forcibly return the HST 52 to a neutral state, when the traveling brake 81 is switched to an on-state by the brake pedal 82 before the HST 52 is returned to a neutral state. Accordingly, as shown in FIGS. 11 and 12, the neutral operation mechanism 100 includes the locking member 97 and a linkage member 101 uniformly rotatably provided on an end portion of the rotary spindle 73.

The linkage member 101 is provided with a through hole 104 formed mainly of two portions: a free hole portion 102 in a shape of an approximate slit extending in a rotational direction of the linkage member 101 about the axis of the rotary spindle 73, and a cam hole portion 103 extending in a direction that crosses the longitudinal direction of the free hole portion 102. The locking member 97 is supported by the interlocking member 84 while inserted through the through hole 104.

Figure 13:
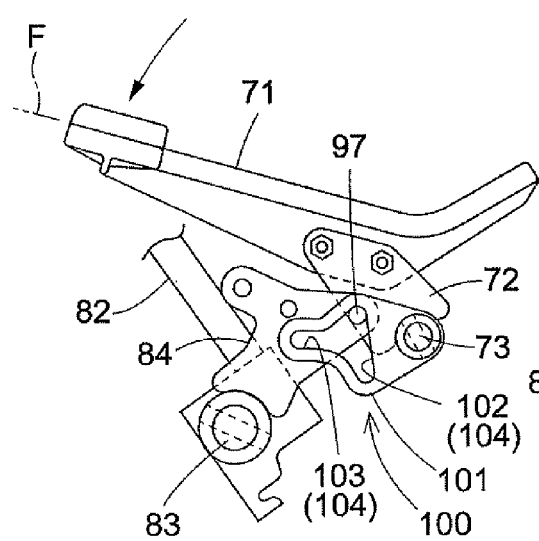
FIG. 13 is a side view of a neutral operation mechanism with a brake pedal at an off-brake position and a shift pedal at an advance position.
Figure 14:
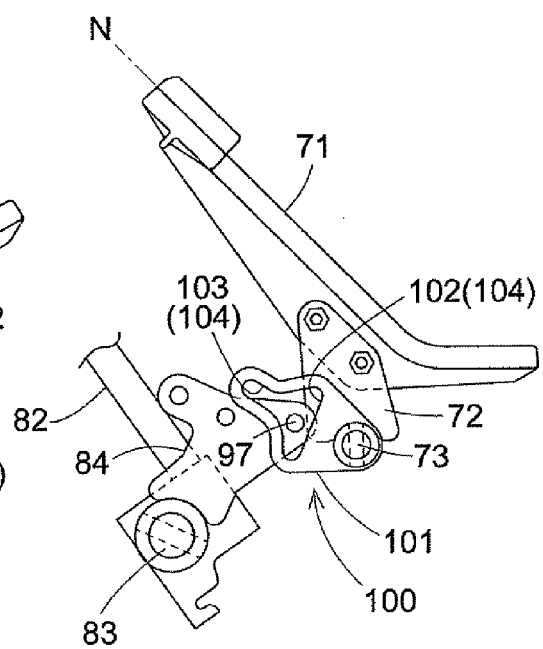
FIG. 14 is a side view of the neutral operation mechanism with the brake pedal at the off-brake position and the shift pedal at a neutral position.
Figure 15:
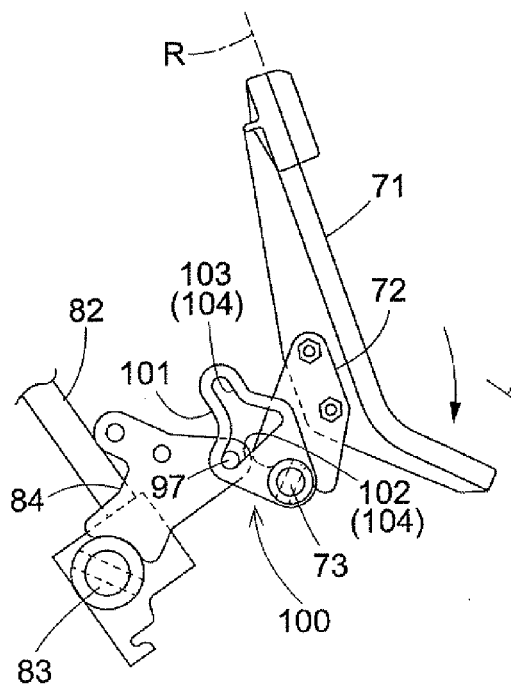
FIG. 15 is a side view of the neutral operation mechanism with the brake pedal at the off-brake position and the shift pedal at a reverse position.

FIG. 13 is a side view of the neutral operation mechanism 100 with the brake pedal 82 at an off-brake position and the shift pedal 71 depressed to an advance position F. FIG. 14 is a side view of the neutral operation mechanism 100 with the brake pedal 82 at the off-brake position and the shift pedal 71 at the neutral position N. FIG. 15 is a side view of the neutral operation mechanism 100 with the brake pedal 82 at the off-brake position and the shift pedal 71 depressed to a reverse position R. As shown in these drawings, when the brake pedal 82 is at the off-brake position, the locking member 97 is in the free hole portion 102 to allow the linkage member 101 to swing about the axis of the rotary spindle 73, and to allow the operation of speed change of the HST 52 by the shift pedal 71.

Figure 16:
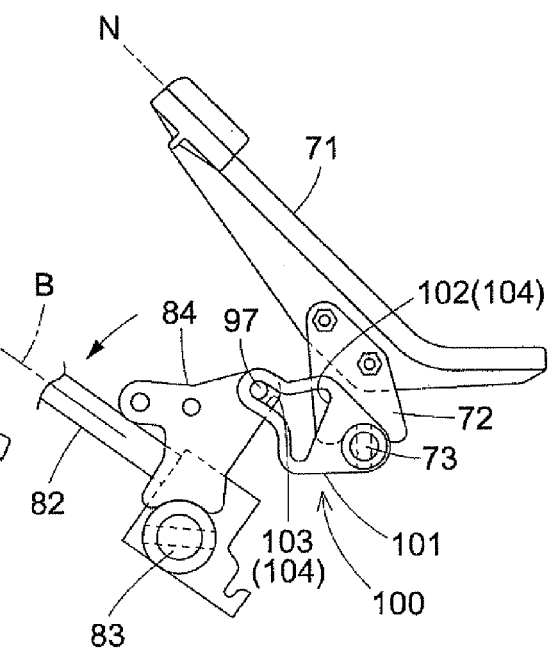
FIG. 16 is a side view of the neutral operation mechanism with the brake pedal depressed.

FIG. 16 is a side view of the neutral operation mechanism 100 with the brake pedal 82 depressed. As shown in this drawing, when the brake pedal 82 is depressed, the interlocking member 84 is swung about the axis of the rotary spindle 83, which shifts the locking member 97 to the cam hole portion 103. In this case, if the shift pedal 71 is not returned to the neutral position (if the shift pedal 71 is depressed to the advance position or reverse position), the locking member 97 is brought into slide contact with an inner wall of the cam hole portion 103 to swing the linkage member 101, which forcibly return the shift pedal 71 to the neutral position. In other words, the HST 52 is forcibly returned to a neutral state.

Other Embodiments

Hereinafter, other embodiments of the mower will be described.

Figure 18:
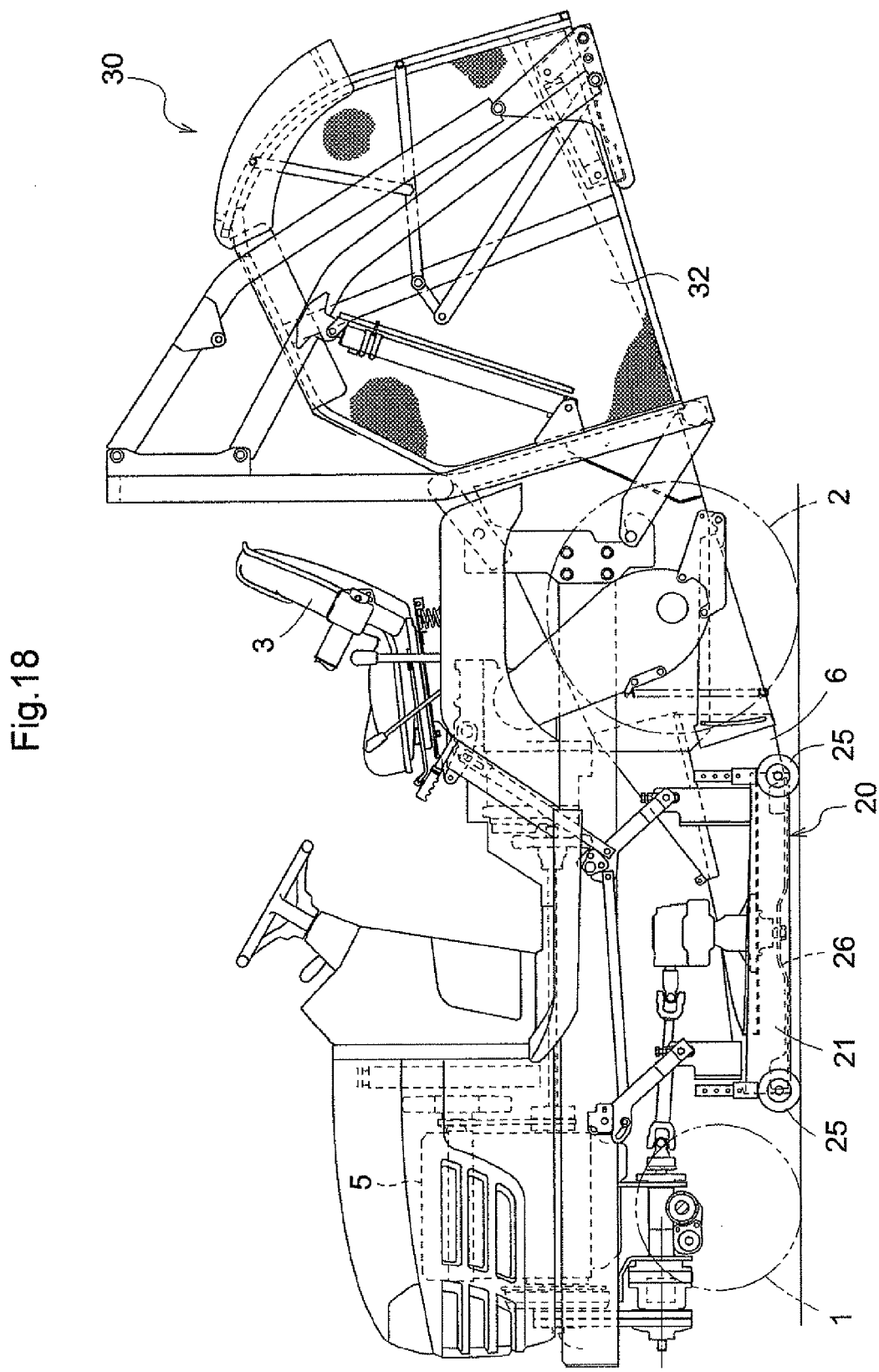
FIG. 18 is an overall side view of a mid-mount type mower.

As shown in an overall side view of FIG. 18, this mower is provided with the mower unit 20 as a working device suspended between the front wheel 1 and the rear wheel 2 in such a manner that the mower unit 20 can be lowered and lifted.

Figure 19:
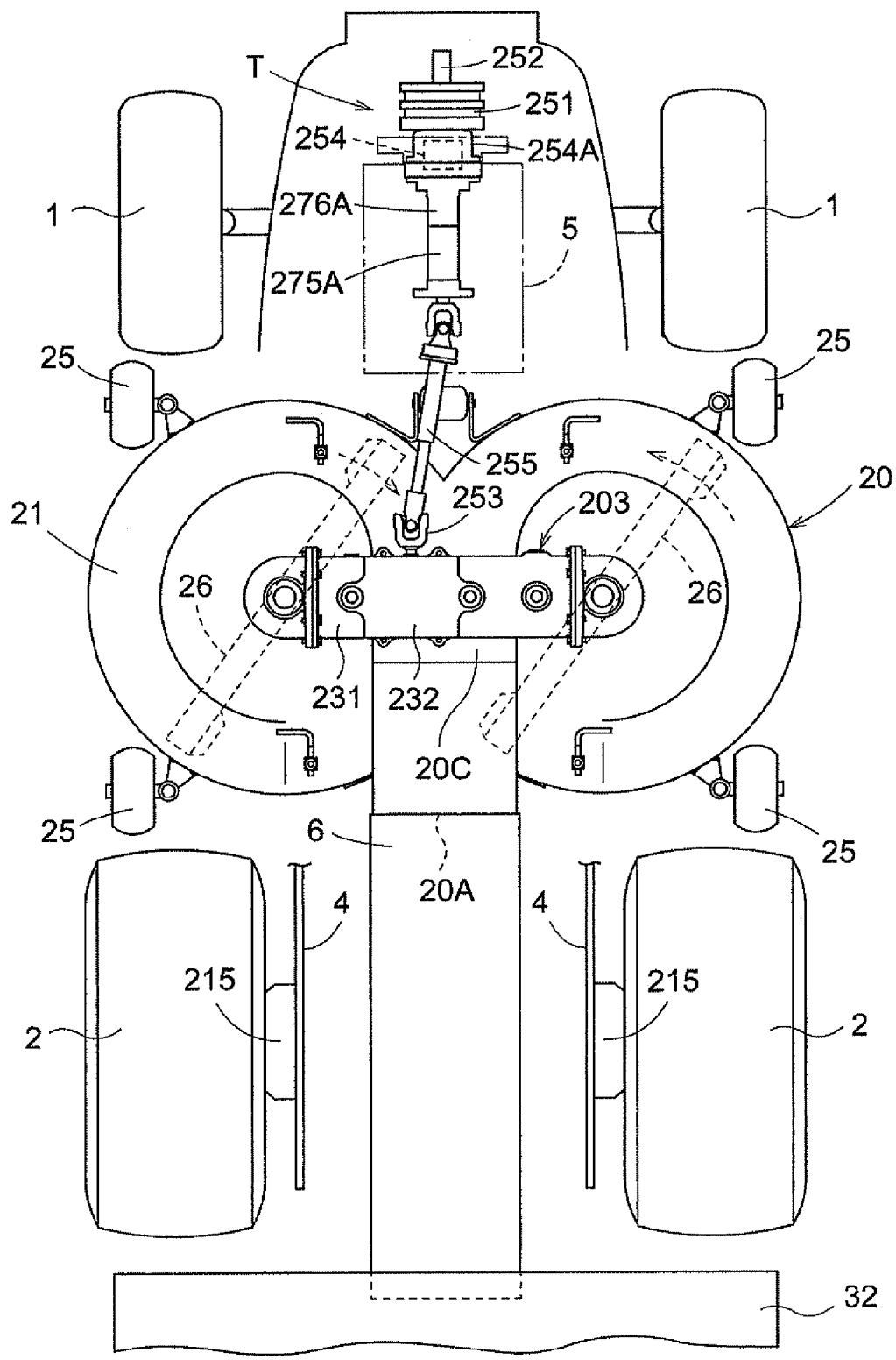
FIG. 19 is an overall plan view of the mid-mount type mower
Figure 20:
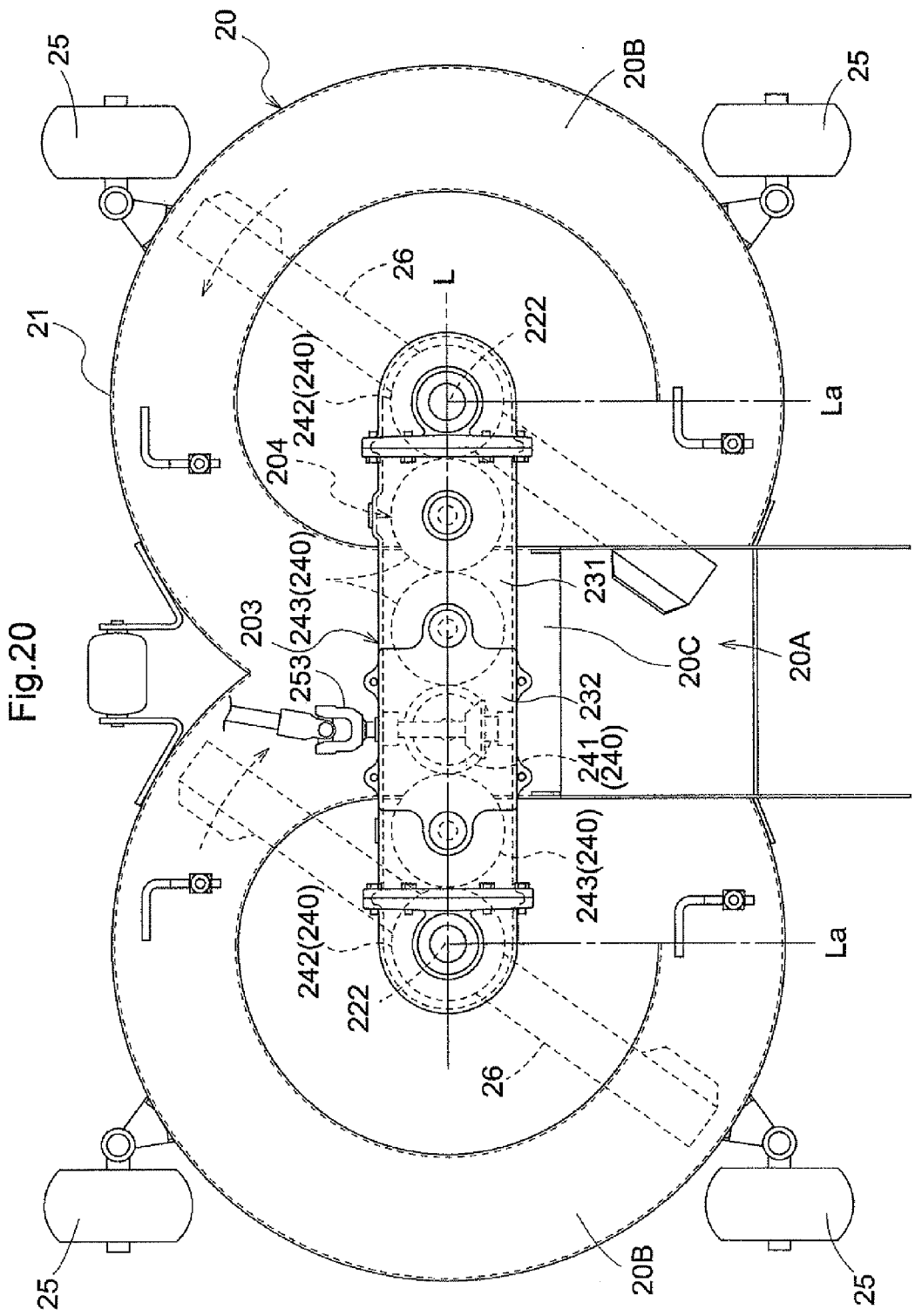
FIG. 20 is a plan view of a rear discharge mower unit.

As shown in FIGS. 19 and 20, the mower unit 20 is of a rear discharge type in which two rotatable blades 26 are laterally aligned in the mower housing 21, with the left blade 26 being driven clockwise and the right blade 26 driven counterclockwise, whose rotations generate conveying air for discharging mown grass from an outlet 20A formed near a center of the rear portion of the mower housing 21. The mown grass discharged from the outlet 20A is guided to the grass-collecting container 32 through the duct 6 arranged between the right and left rear wheels 2.

Figure 21:
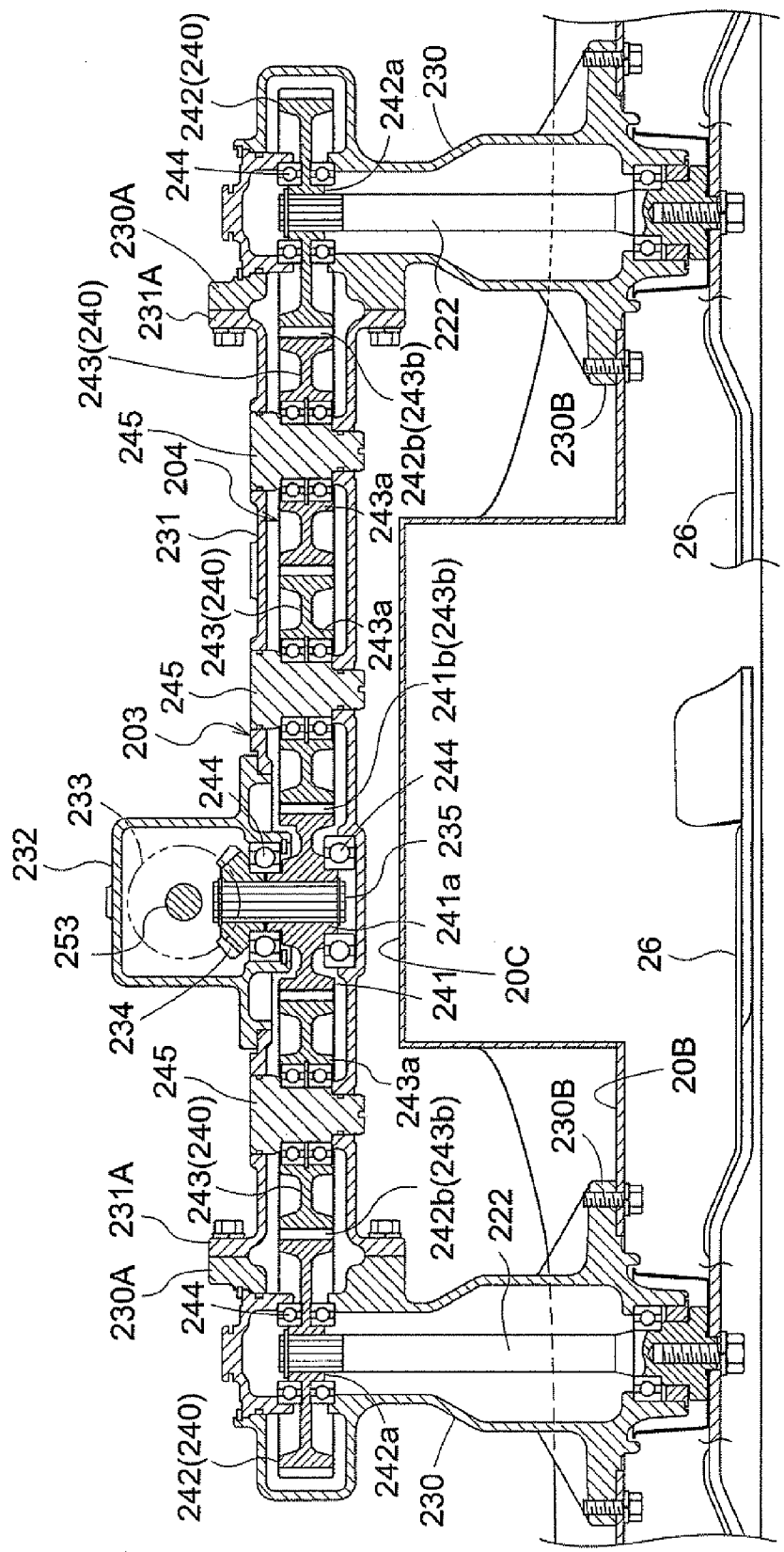
FIG. 21 is a longitudinal section along a lateral direction showing a transmission system of the rear discharge mower unit.

As shown in FIGS. 20 and 21, blade shafts 222 for rotatably supporting the corresponding right and left blades 26 of the mower unit 20 are connected in a interlocking manner through a transmission mechanism 204 composed of a row of flat gears 240 installed in a blade driving case 203.

The blade driving case 203 is formed of cylindrical shaft cases 230 in which the corresponding blade shafts 222 are installed, and a connecting case 231 connecting upper end portions of the cylindrical shaft cases 230, with an interior space of the connecting case 231 having the flat gears 240 for transmission installed therein.

As shown in FIGS. 20 and 21, to an intermediate portion of the connecting case 231 is fixed a gearbox 232 which is provided with: a bevel gear 233 formed on an end of a transmission shaft 253 connected to a work power takeoff shaft 252 on the front side of the vehicle body; and an input shaft 235 whose end has a bevel gear 234 configured to bite the bevel gear 233.

A boss portion 241a of an input flat gear 241 spline-fitted to a spline formed in a portion of the input shaft 235 protruding from the gearbox 232 is supported by the intermediate portion of the connecting case 231 through ball bearings 244. Between the input flat gear 241 and an output flat gear 242 spline-fitted to an end of one of the blade shafts 222, an odd number of, i.e., one relay flat gear 243 is disposed. Between the input flat gear 241 and an output flat gear 242 spline-fitted to an end of the other of the blade shafts 222, an even number of, i.e., two relay flat gears 243 are disposed.

The flat gear 240 forming the transmission mechanism 204 is composed of the flat gears 241,242,243. The right and left blades 26 connected in an interlocking manner through the transmission mechanism 204 composed of the flat gears 240 are arranged so that rotational trajectories thereof partially overlap, with a lag in phases thereof as shown in FIG. 20, in order to prevent a collision of the blades 26.

The boss portion 241a,242a of the corresponding input and output flat gears 241,242 amongst the flat gears 241,242,243 are axially received in the connecting case 231 through the respective ball bearings 244. In addition, an inner periphery of each of the boss portions 241a,242a of the corresponding input and output flat gears 241,242 has a spline formed therein, which is removably inserted into an upper end portion with a spline formed therein of the corresponding input shaft 235 and the blade shaft 222.

In each of the flat gears 241,242,243, the corresponding boss portion (241a, 242a or 243a) and the corresponding cog portion (241b, 242b or 243b) are made thicker, while a hub portion therebetween is made thinner.

In a pivot shaft 245 of the relay flat gear 243, an upper end portion has the largest diameter, an intermediate portion which is axially supported by the bearing has a smaller diameter, and an lower end portion has a diameter smaller than an inner diameter of the bearing, and as a whole the pivot shaft 245 is made removable and insertable from above.

Though the cylindrical shaft case 230 having the blade shaft 222 installed therein and the connecting case 231 are separately formed, they are uniformly connected with bolts at connecting flange portions 230A,231A. In a lower end portion of the cylindrical shaft case 230, a cylindrical axial case portion has a larger diameter than a diameter on an upper end side, and a flange portion 230B having a further larger diameter is integrally formed on a lower end side, which is connected to the housing top wall 20B with bolts.

In this manner, the blade driving case 203 as an assembled body can be fixed to the housing top wall 20B with bolts, and therefore workability in assembling is improved.

As shown in FIGS. 18 to 21, the housing top wall 20B of the mower housing 21 has a raised portion 20C gradually raised from a position in the vicinity of a line La in FIG. 20 along an outer circumference direction of the top wall 20B. With the proviso that a space around a hypothetical line L connecting the shaft centers of the blade shafts 222 is where mown grass is started to be discharged, the raised portion 20C gradually raised in approximately three fourth of the outer circumference serves a function to smoothly introduce the mown grass from the outlet 20A to the connected duct 6.

Figure 23:
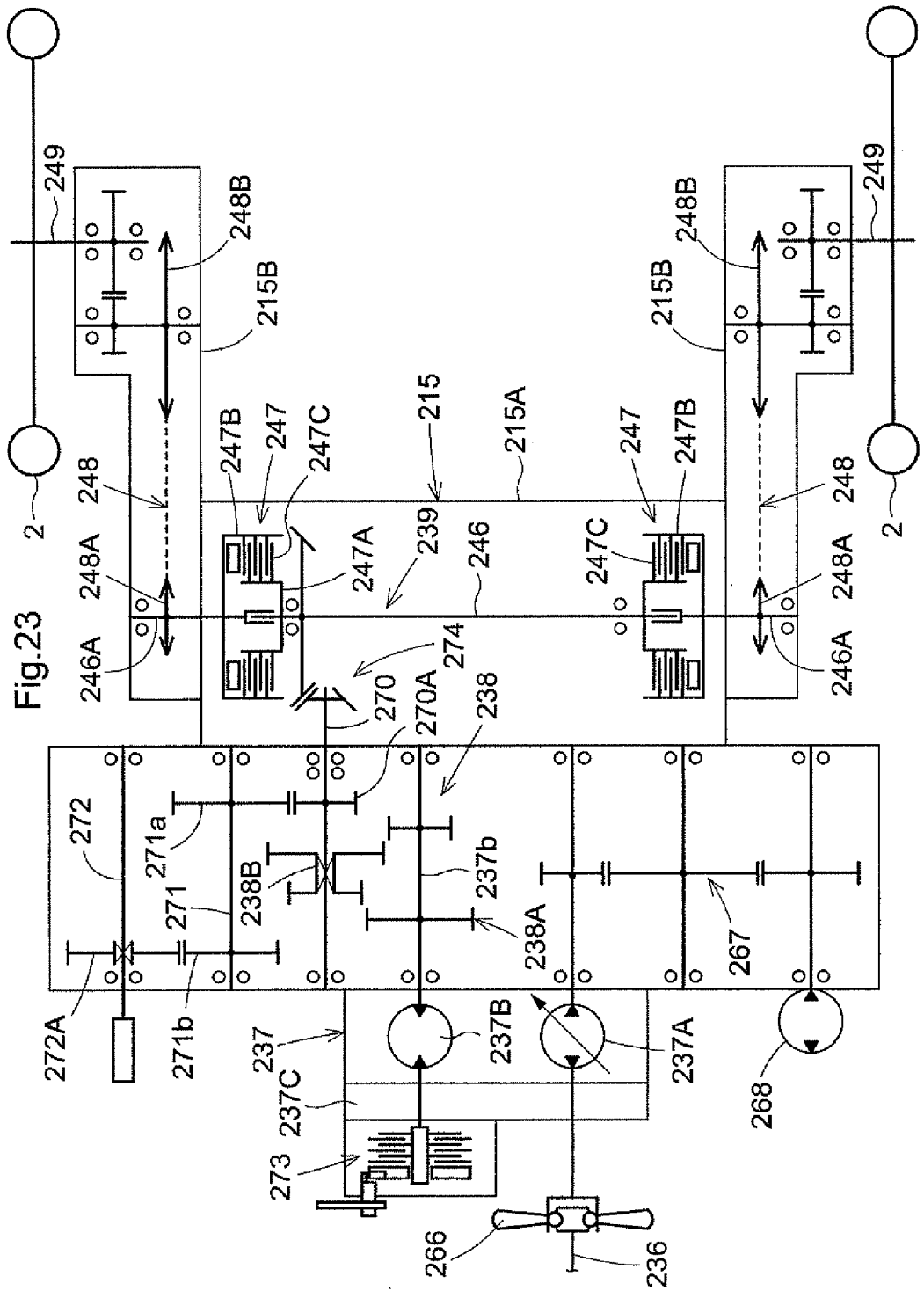
FIG. 23 is a diagram showing a transmission system for rear wheels provided with a side clutch mechanism.

A transmission mechanism for the rear wheel 2 will be described. As shown in FIG. 23, to a transmission shaft 236 extending rearward from the rear portion of the engine 5 is connected a hydrostatic transmission 237, and power from the hydrostatic transmission 237 is made transmittable to a rear wheel transmission mechanism 239 through an auxiliary speed change mechanism 238. The rear wheel transmission mechanism 239 includes: a laterally-extending rear axle 246 installed in a laterally-extending case portion 215A of a rear axle case 215; hydraulic pressure multiplate friction type side clutch mechanisms 247 installed in both ends of the laterally-extending rear axle 246; and rear wheel chain transmission mechanisms 248 configured to receive power transmission from the respective side clutch mechanisms 247.

The rear wheel chain transmission mechanism 248 is installed in a rear wheel chain case portion 215B of the rear axle case 215.

A structure of the hydrostatic transmission 237 will be described. As shown in FIG. 23, the hydrostatic transmission 237 is provided with a hydraulic pump 237A whose volume is variable, a hydraulic motor 237B whose volume is fixed, and a hydraulic block 237C with an oil passage communicating between the hydraulic pump 237A and the hydraulic motor 237B.

An input side of the hydraulic pump 237A is provided with a cooling fan 266, attached to the transmission shaft 236 for the hydraulic pump 237A so as to rotate uniformly with the transmission shaft 236.

To a portion of the transmission shaft 236 protruding from the hydraulic pump 237A is attached a gear transmission mechanism 267 through which a hydraulic pump 268 receives power from the transmission shaft 236.

On the other hand, as shown in FIG. 23, to an end portion of an output shaft 237b of the hydraulic motor 237B is attached the auxiliary speed change mechanism 238 which is composed of two large and small output gears 238A attached to the output shaft 237b of the hydraulic motor 237B and an input gear 238B slidably attached to an output bevel gear shaft 270, as a gear shift mechanism switchable between high and low.

A portion of the output shaft 237b of the hydraulic motor 237B extending towards the front wheel 1 side is provided with a traveling brake 273.

The output bevel gear shaft 270 of the auxiliary speed change mechanism 238 is provided with an output gear 270A, and in parallel with the output bevel gear shaft 270, a relay shaft 271 and a front wheel output shaft 272 are arranged for outputting to the front wheel 1.

A large gear portion 271a and a small gear portion 271b are integrally formed on the relay shaft 271, while a clutch gear 272A is slidably attached to the front wheel output shaft 272. The small gear portion 271b of the relay shaft 271 and the clutch gear 272A are arranged so as to detachably bite each other, and forms a clutch mechanism to the front wheel 1.

With this configuration, drive power can be transmitted to the front wheel 1 to enable four-wheel driving, and at the same time, drive power to the front wheel 1 can be disconnected to switch to two-wheel driving.

Figure 24:
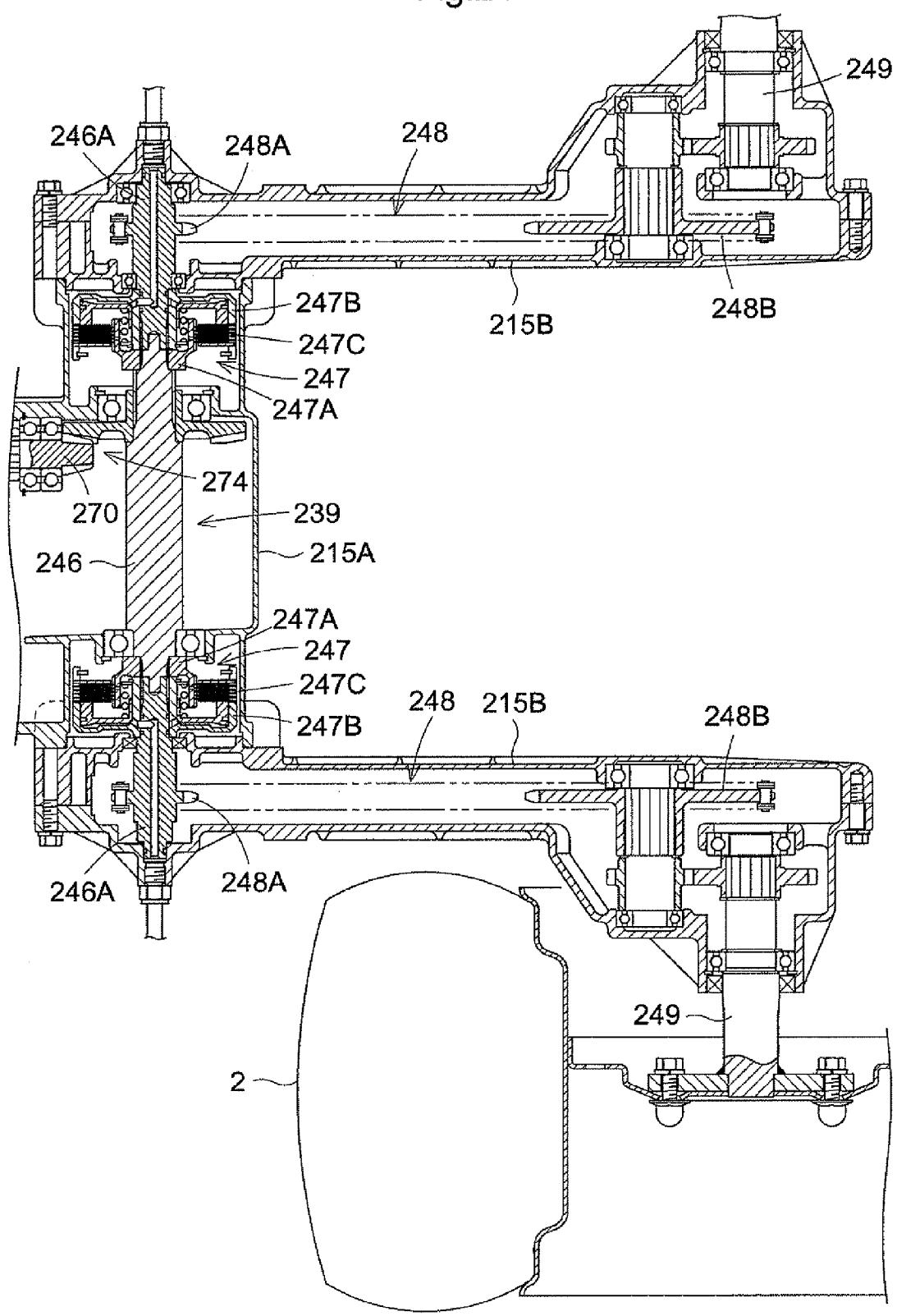
FIG. 24 is a transversal plan view showing the transmission system for the rear wheels provided with the side clutch mechanism.

A transmission system for the rear wheel transmission mechanism 239 will be described. As shown in FIGS. 23 and 24, a bevel gear transmission mechanism 274 is disposed between the output bevel gear shaft 270 of the auxiliary speed change mechanism 238 and the rear axle 246, together forming a transmission system for rear wheel axles 249.

To each of the right and left ends of the rear axle 246 is relatively rotatably connected a rear side shaft 246A, and the side clutch mechanism 247 is provided at a connecting portion of the rear axle 246 and the rear side shaft 246A. In this manner, with the use of the side clutch mechanism 247, more gentle turning of the vehicle body is possible as compared with a use of a hand brake (emergency brake), and an agricultural field is less disturbed.

Specifically, the side clutch mechanism 247 is composed of a clutch body 247A as an output side member attached to the end of the rear axle 246, a clutch case 247B attached to the rear side shaft 246A, and a friction multiplate 247C disposed between the clutch body 247A and the clutch case 247B.

As shown in FIGS. 23 and 24, in the rear axle case 215, the rear wheel chain case portions 215B are connected to both ends of the laterally-extending case portion 215A, and the rear side shaft 246A is protruded in the rear wheel chain case portion 215B. On the rear side shaft 246A is integrally formed an output-side chain sprocket 248A, and an input-side chain sprocket 248B is axially supported at a rear end portion of the rear wheel chain case portion 215B. An endless chain (not shown) is wrapped around these sprockets so as to transmit power to the rear wheel 2.

The rear wheel 2 is attached to the rear wheel axle 249 which is rotatably supported by the rear wheel chain case portion 215B. Between the rear wheel axle 249 and a mounting shaft of the input-side chain sprocket 248B, a reduction gear mechanism is provided so as to transmit power to the rear wheel 2.

As described above, the transmission system to the rear wheel 2 is provided with the hydraulic pressure multiplate friction type side clutch mechanism 247.

Conventionally, the clutch body and the clutch case are biased in a direction that both are apart from each other by a bias spring, and at the same time, the clutch body and the clutch case are driven in a direction that both approach each other against a bias spring force by an actuation of a cam mechanism relative to the clutch body (not shown).

The cam mechanism is conventionally configured to be operated by a manually operating tool linked through a wire mechanism. In this case, an operation system may not have satisfactory durability, and it may be difficult to increase a clutch volume. In comparison, in the case of the present embodiment, the multiplate friction side clutch mechanism 247 of a hydraulic type is introduced, which attains satisfactory durability and clutch volume.

Figure 22:
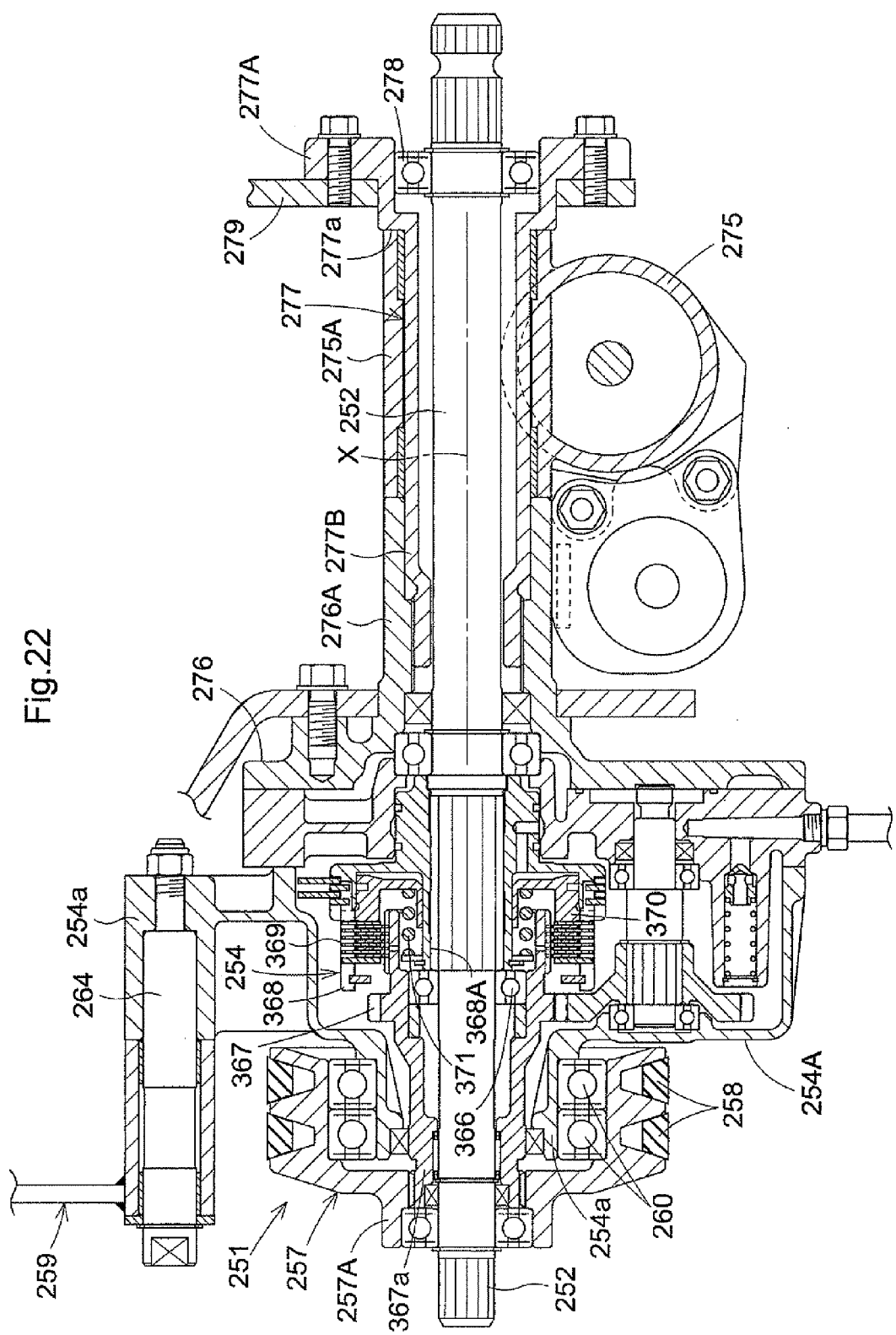
FIG. 22 is a longitudinal sectional side view showing a hydraulic pressure multiple friction clutch mechanism and a work transmission device.
Figure 25:
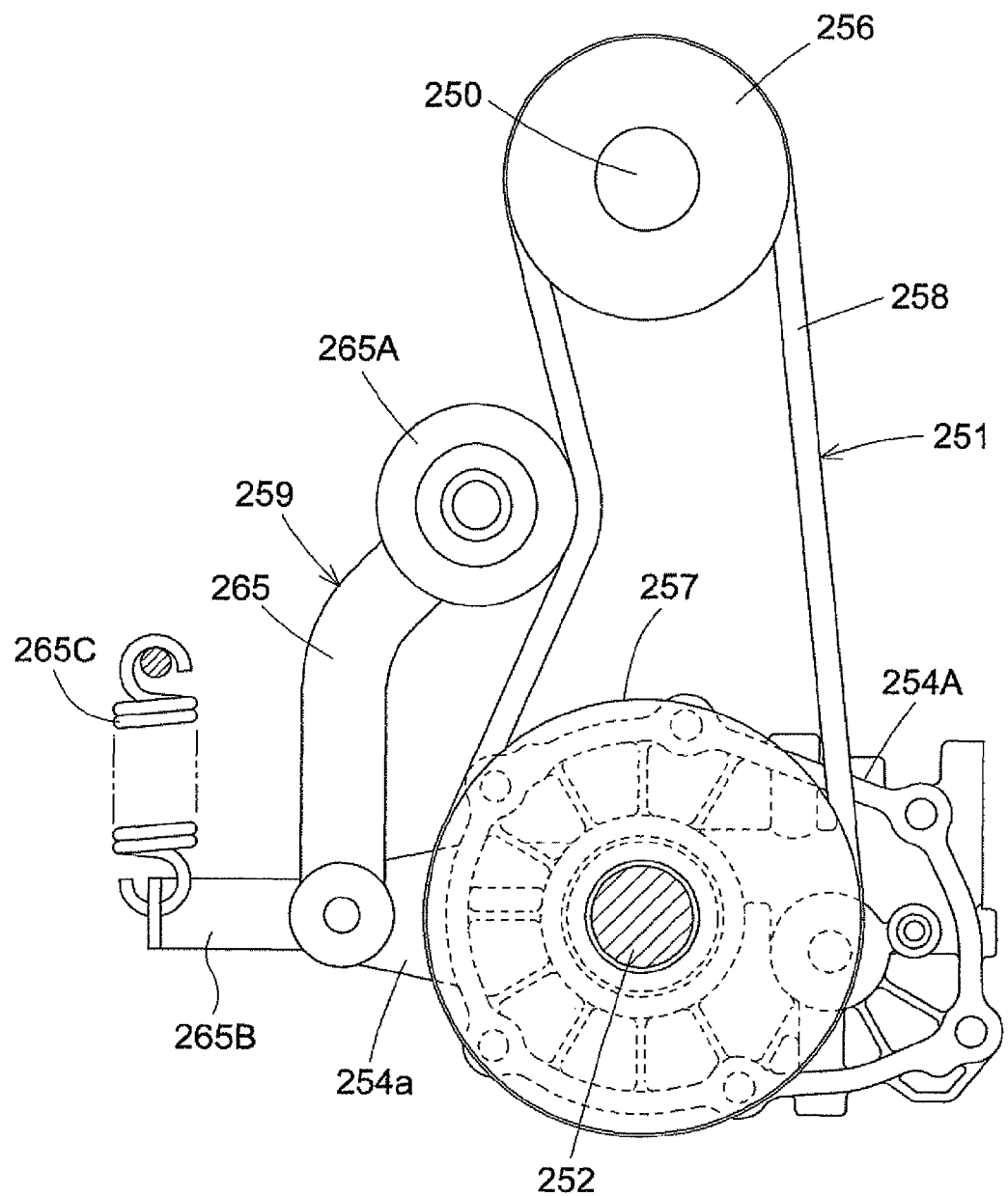
FIG. 25 is a front view of a belt transmission mechanism.

Next, a transmission system from the engine 5 to the mower unit 20 will be described. As shown in FIGS. 18, 22 and 25, the transmission system is provided with: a belt transmission mechanism 251 configured to receive engine power; a hydraulic type multiplate friction clutch 254 configured to receive the power transmission from the belt transmission mechanism 251; the work power takeoff shaft 252 configured to receive the power transmission from the hydraulic type multiplate friction clutch 254; and a relay shaft 255 configured to transmit the power from the work power takeoff shaft 252 to the transmission shaft 253 supported by the gearbox 232.

The belt transmission mechanism 251 will be described. As shown in FIGS. 22 and 25, the belt transmission mechanism 251 is provided with an output pulley 256 and an input pulley 257 each mounted on a front portion of the output shaft 250 of the engine 5, a transmission belt 258 wrapped around the pulleys 256,257, and a tension mechanism 259 for the transmission belt 258.

A fitting mechanism for the input pulley 257 will be described. As shown in FIGS. 22 and 25, a boss portion 254a extends frontward from a front end portion of a clutch case 254A encasing the hydraulic type multiplate friction clutch 254. Between the boss portion 254a and a protruding end of the work power takeoff shaft 252 extending from the boss portion 254a, the input pulley 257 is rotatably supported through bearings 260.

The tension mechanism 259 will be described. As shown in FIGS. 22 and 25, the mounting boss portion 254a extends laterally from the clutch case 254A and a spindle 264 is attached to the mounting boss portion 254a. By a portion of the spindle 264 protruding from the mounting boss portion 254a, a tension arm 265 is rotatably supported. To an end of the tension arm 265 is rotatably attached a tension wheel 265A configured to press the transmission belt 258. An auxiliary arm 265B extends orthogonally from the tension arm 265, to which a bias spring 265C is led to thereby bias the tension wheel 265A to the transmission belt 258.

The hydraulic type multiplate friction clutch 254 will be described. As shown in FIG. 22, the hydraulic type multiplate friction clutch 254 includes: an input clutch body 367 rotatably supported by the work power takeoff shaft 252 through a bearing 366; a clutch body 368 configured to receive power transmitted from the input clutch body 367; and a friction multiplate 369 disposed between the input clutch body 367 and the clutch body 368 for contributing a power transmission.

The clutch body 368 holds a pressure piston 370 which is biased in a direction away from the friction multiplate 369 by a return spring 371 and is configured to press the friction multiplate 369 by receiving a hydraulic pressure of the operating oil.

When the friction multiplate 369 is pressed by the pressure piston 370, power is transmitted from the input clutch body 367 to the clutch body 368.

The input clutch body 367 is configured to transmit power with a spline fitting part formed between an outer periphery of a front end portion 367a and an inner periphery of a boss portion 257A of the input pulley 257.

On the other hand, the clutch body 368 is configured to transmit an output by being spline-fitted between an inward face 368A of the clutch body 368 and an outer periphery of the work power takeoff shaft 252.

With the above-described configuration, engine power is transmitted to the hydraulic type multiplate friction clutch 254 through the belt transmission mechanism 251, and output from the hydraulic type multiplate friction clutch 254 to the work power takeoff shaft 252.

Next, a fitting mechanism of a front axle case 275 will be described. As shown in FIG. 22, to the clutch case 254A containing the hydraulic type multiplate friction clutch 254 is fixed a front connecting body 276, a portion of which extends rearward as a cylindrical portion 276A to cover a portion of the work power takeoff shaft 252 protruding rearward from the hydraulic type multiplate friction clutch 254.

A cylindrical rear connecting body 277 is disposed rearward of the cylindrical portion 276A, which also covers the work power takeoff shaft 252 and includes a fitting flange portion 277A on an rear end and a cylindrical portion 277B extending frontward therefrom. A front half of the cylindrical portion 277B of the rear connecting body 277 is fitted in the cylindrical portion 276A of the front connecting body 276, in such a manner that an outer periphery of the front half is in slidable contact with an inner periphery of the cylindrical portion 276A.

As shown in FIG. 22, the front connecting body 276 and the rear connecting body 277 are slidably disposed relative to the work power takeoff shaft 252, through a bearing 278 disposed between an inner periphery of the fitting flange portion 277A and an outer periphery of the work power takeoff shaft 252.

Accordingly, a front bracket (not shown) and a rear bracket 279 extends from the body frame 4, with the front bracket fixed to the front connecting body 276 and with the rear bracket 279 fixed to the fitting flange portion 277A of the rear connecting body 277.

With this configuration, the work power takeoff shaft 252, the hydraulic type multiplate friction clutch 254, the front connecting body 276 and the rear connecting body 277 are attached to and supported by the body frame 4.

Downward of the front connecting body 276 and the rear connecting body 277, the front axle case 275 extending in a lateral direction is disposed. To an upper face of the front axle case 275 is fixed a cylindrical boss 275A whose axis line extends in the front-rear direction.

The cylindrical boss 275A is fitted onto the cylindrical portion 277B of the rear connecting body 277 in such a manner that the cylindrical boss 275A and the front axle case 275 are capable of rolling action about an axis line X of the work power takeoff shaft 252 relative to the rear connecting body 277.

As shown in FIG. 22, a front end of the cylindrical boss 275A is brought into contact with a rear end of the cylindrical portion 276A of the front connecting body 276, and a rear end of the cylindrical boss 275A is received by a step portion 277a formed in the cylindrical portion 277B of the rear connecting body 277. Accordingly, a movement of the cylindrical boss 275A in the front-rear direction is restricted.

With the configuration described above, the work power takeoff shaft 252 is positioned at a rolling fulcrum of the front axle case 275, and the work power takeoff shaft 252 functions as a holder for the front axle case 275.

In addition, the belt transmission mechanism 251 can be positioned upward of the front axle case 275, with a satisfactory height from the ground. As a result, a belt is less likely to be brought into contact with weed or the like, preventing a damage in the belt.

The mower of another embodiment as described above, with respect to the power transmission system to the mower unit 20, has the following features and effects.

(1) The work transmission system connects the engine and the mower unit 20 between the front and rear wheels, with the mechanism of the work transmission system being disposed downward of the engine and upward of the front axle case. The work transmission system is provided with the hydraulic type clutch mechanism.

By omitting a belt tension clutch and introducing the hydraulic type clutch mechanism, a space required for installing the belt tension clutch can be omitted, and thus a distance between the engine output shaft and the hydraulic type clutch mechanism can be reduced, and the hydraulic type clutch mechanism can be positioned upward of the front axle case. As a result, the hydraulic type clutch mechanism is less likely to be brought into contact with stones and obstacles, standing weed and grass or the like on the ground.

As compared with the belt tension clutch which tends to be exposed outside, the hydraulic type clutch mechanism can be easily encased in the housing of the work transmission device, leading to a satisfactory durability of the hydraulic type clutch mechanism itself. Accordingly, a clutch mechanism having a high durability can be introduced, which is hardly affected by standing weed or the like.

(2) The work power takeoff shaft configured to output power transmitted from the hydraulic type clutch mechanism to the work transmission system extends in the front-rear direction and is positioned at the rolling fulcrum of the front axle case. With this configuration, the work power takeoff shaft can serve as the rolling fulcrum, leading to a simplified structure.

What is claimed is:

1. A work vehicle comprising:
a body frame;
an engine supported by the body frame through an elastic body;
a belt transmission mechanism connected to an output shaft of the engine in a power transmissive manner;
a power takeoff (PTO) mechanism connected to the belt transmission mechanism in a power transmissive manner to take out power from the engine; and
a PTO support bracket configured to support the PTO mechanism, the PTO support bracket being attached to the engine,
wherein the belt transmission mechanism comprises: a transmission belt; an output pulley attached to the output shaft; an input pulley attached to an input shaft for the PTO mechanism; and a tension wheel configured to adjust a tension of the transmission belt, the tension wheel and the input pulley are arranged downward of the output shaft and apart rightward and leftward along a lateral direction of a vehicle body from a position directly below the output shaft.

2. The work vehicle according to claim 1, wherein the PTO mechanism comprises: a power takeoff shaft (PTO shaft) in parallel with the output shaft; and a friction clutch configured to connect and disconnect a power transmission from the output shaft to the PTO shaft.

3. The work vehicle according to claim 2, an input shaft for the PTO mechanism and the PTO shaft are coaxially arranged, and the friction clutch is disposed therebetween.

4. The work vehicle according to claim 1, wherein the engine is disposed at a front portion of a vehicle body, a mower unit is disposed at an intermediate portion of the vehicle body, and the PTO mechanism is configured to transmit power to the mower unit.

5. The work vehicle according to claim 4, wherein a universal coupling is disposed on a power transmission line between the PTO mechanism and the mower unit.

6. The work vehicle according to claim 4, further comprising:
a hydrostatic transmission configured to convert power from the output shaft of the engine into advance drive power or reverse drive power and to transmit the converted power to a pair of right and left rear wheels; and
a conveyance duct running between the rear wheels and configured to convey mown grass from the mower unit to a rear side of the vehicle body,
wherein a rear wheel drive case disposed at a rear portion of the vehicle body and configured to drivably support the rear wheels comprises: a pair of right and left rear wheel transmission case portions extending in a vertical direction of the vehicle body and flanking both lateral sides of the conveyance duct, each having a lower end portion configured to support the rear wheel; and
an input case portion extending in a lateral direction of the vehicle body disposed upward of the conveyance duct and connected to upper end portions of the respective rear wheel transmission case portions, and the hydrostatic transmission having a hydraulic pump and a hydraulic motor is connected to a front portion of the input case portion, with the hydraulic pump arranged lower than the hydraulic motor.

7. The work vehicle according to claim 6, wherein each of the rear wheel transmission case portions tilts from a front side to a rear side of the vehicle body, when seen from a lateral side of the vehicle body.

8. A work vehicle comprising:
a body frame;
an engine supported by the body frame through an elastic body;
a belt transmission mechanism connected to an output shaft of the engine in a power transmissive manner;
a power takeoff (PTO) mechanism connected to the belt transmission mechanism in a power transmissive manner to take out power from the engine;
a mower unit disposed at an intermediate portion of the vehicle body, to which power is transmitted from the PTO mechanism;
a hydrostatic transmission configured to convert power from the output shaft of the engine into advance drive power or reverse drive power and to transmit the converted power to a pair of right and left rear wheels;
a conveyance duct running between the rear wheels and configured to convey mown grass from the mower unit to a rear side of the vehicle body; and
a rear wheel drive case disposed at a rear portion of the vehicle body and configured to drivably support the rear wheels, comprising
a pair of right and left rear wheel transmission case portions extending in a vertical direction of the vehicle body and flanking both lateral sides of the conveyance duct, each having a lower end portion configured to support the rear wheel; and
an input case portion extending in a lateral direction of the vehicle body disposed upward of the conveyance duct and connected to upper end portions of the respective rear wheel transmission case portions,
wherein the hydrostatic transmission having a hydraulic pump and a hydraulic motor is connected to a front portion of the input case portion, while the hydraulic pump is arranged lower than the hydraulic motor.

9. A work vehicle comprising:
a body frame;
an engine supported by the body frame through an elastic body;
a belt transmission mechanism connected to an output shaft of the engine in a power transmissive manner; and
a power takeoff (PTO) mechanism connected to the belt transmission mechanism in a power transmissive manner to take out power from the engine; and
a PTO support bracket configured to support the PTO mechanism, the PTO support bracket being attached to the engine;
wherein the PTO mechanism comprises: a power takeoff shaft (PTO shaft) in parallel with the output shaft; and a friction clutch configured to connect and disconnect a power transmission from the output shaft to the PTO shaft; and
wherein an input shaft for the PTO mechanism and the PTO shaft are coaxially arranged, and the friction clutch is disposed therebetween.

* * * * *